(12) United States Patent
Chung et al.

(10) Patent No.: US 6,968,329 B1
(45) Date of Patent: Nov. 22, 2005

(54) EVENT-DRIVEN AND LOGIC-BASED DATA TRANSFORMATION

(75) Inventors: Eui-Suk Chung, San Francisco, CA (US); Bill Stanton, San Francisco, CA (US); Joe Latone, San Francisco, CA (US)

(73) Assignee: Syniverse Brience, LLC, Tampa, FL (US)

( * ) Notice: Subject to any disclaimer, the term of this patent is extended or adjusted under 35 U.S.C. 154(b) by 761 days.

(21) Appl. No.: 09/965,053

(22) Filed: Sep. 26, 2001

(51) Int. Cl.$^7$ .............................................. G06F 17/00
(52) U.S. Cl. ......................................... 706/46; 706/45
(58) Field of Search ..................................... 706/46, 45

(56) References Cited

U.S. PATENT DOCUMENTS

| | | | |
|---|---|---|---|
| 6,314,415 B1 * | 11/2001 | Mukherjee | 706/47 |
| 6,356,886 B1 * | 3/2002 | Doyle | 706/46 |
| 6,446,058 B1 * | 9/2002 | Brown | 706/60 |
| 6,587,853 B1 * | 7/2003 | LaRue | 707/9 |
| 6,691,122 B1 * | 2/2004 | Witte et al. | 707/101 |
| 6,742,141 B1 * | 5/2004 | Miller | 714/26 |
| 6,810,401 B1 * | 10/2004 | Thompson et al. | 707/101 |

OTHER PUBLICATIONS

Batur er al, "Self-Organizing Model Expert Controller", IEEE International Conference on System Engineering, Aug. 1989.*

Jer Min et al, "Design and Implementation of a Self-Adaptive Fuzzy Inference Engine", IEEE International Joint Conference on Fuzzy Systems, Mar. 1995.*

* cited by examiner

Primary Examiner—George Davis
(74) Attorney, Agent, or Firm—Hogan & Hartson L.L.P.

(57) ABSTRACT

An extensible method and system for dynamically transforming and routing the WWW content is provided that can enable efficient delivery and presentation of the content for a variety of end-user devices. Processing of HTTP request and response messages is combined with event-driven machinery that can perform transformations and routing of data or content. The machinery can include a logic-based inference engine adapted to determine which transformations are applicable in any given context. A knowledge base for the content adaptation and routing may also be provided. The knowledge base is segmented so that search space for the inference engine can be significantly reduced in any given context. Since the search space is much narrower, searching can be performed much more efficiently, which can result in improved performance.

65 Claims, 12 Drawing Sheets

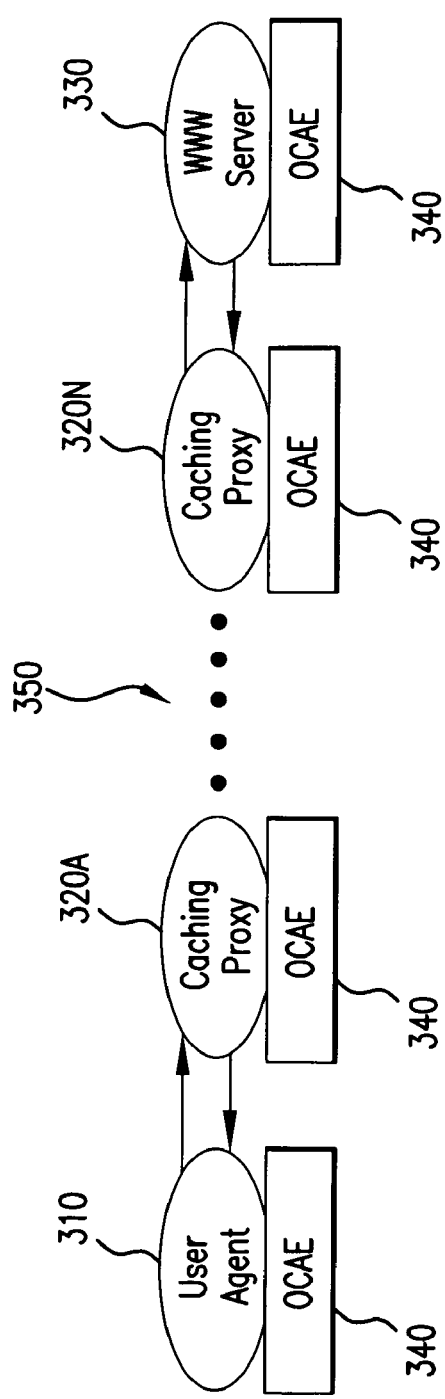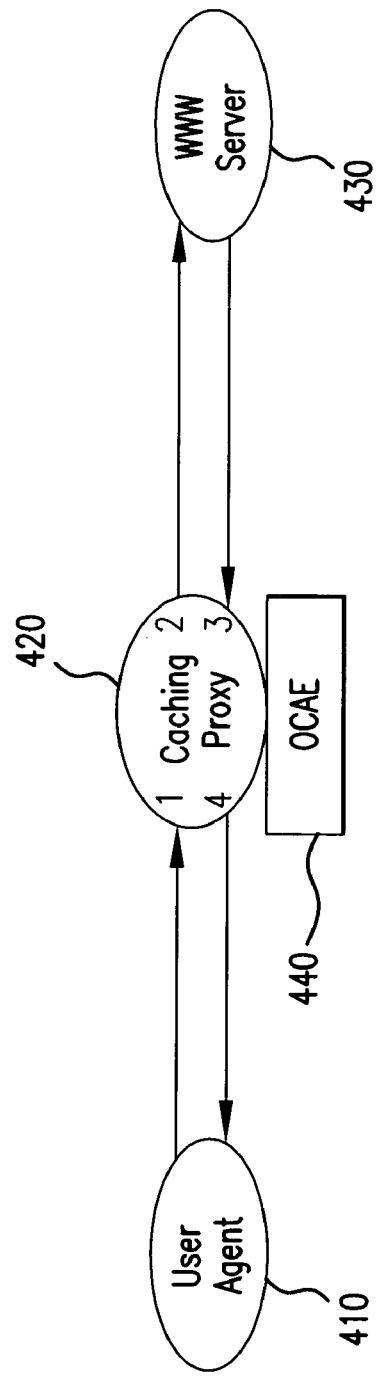

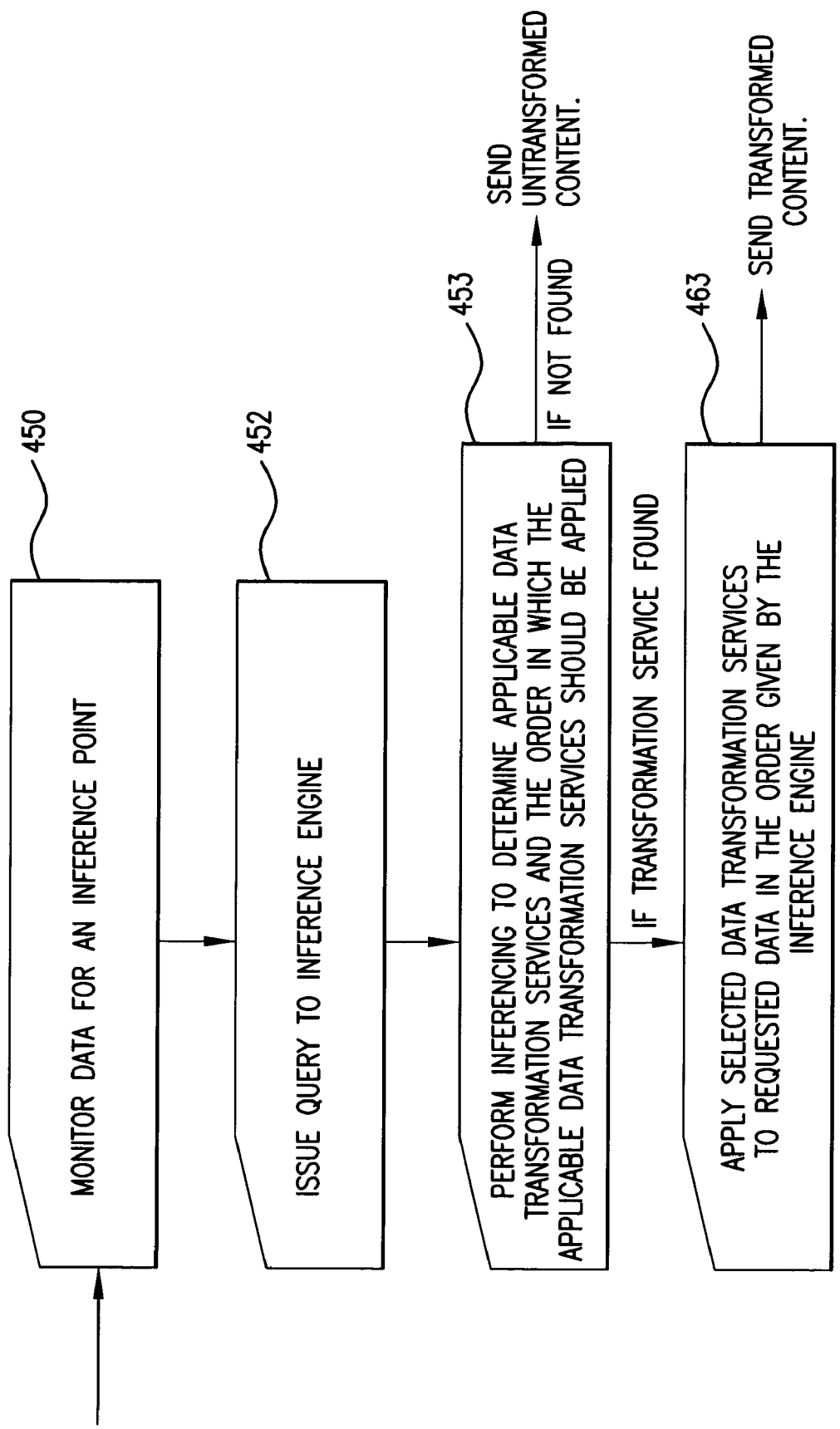

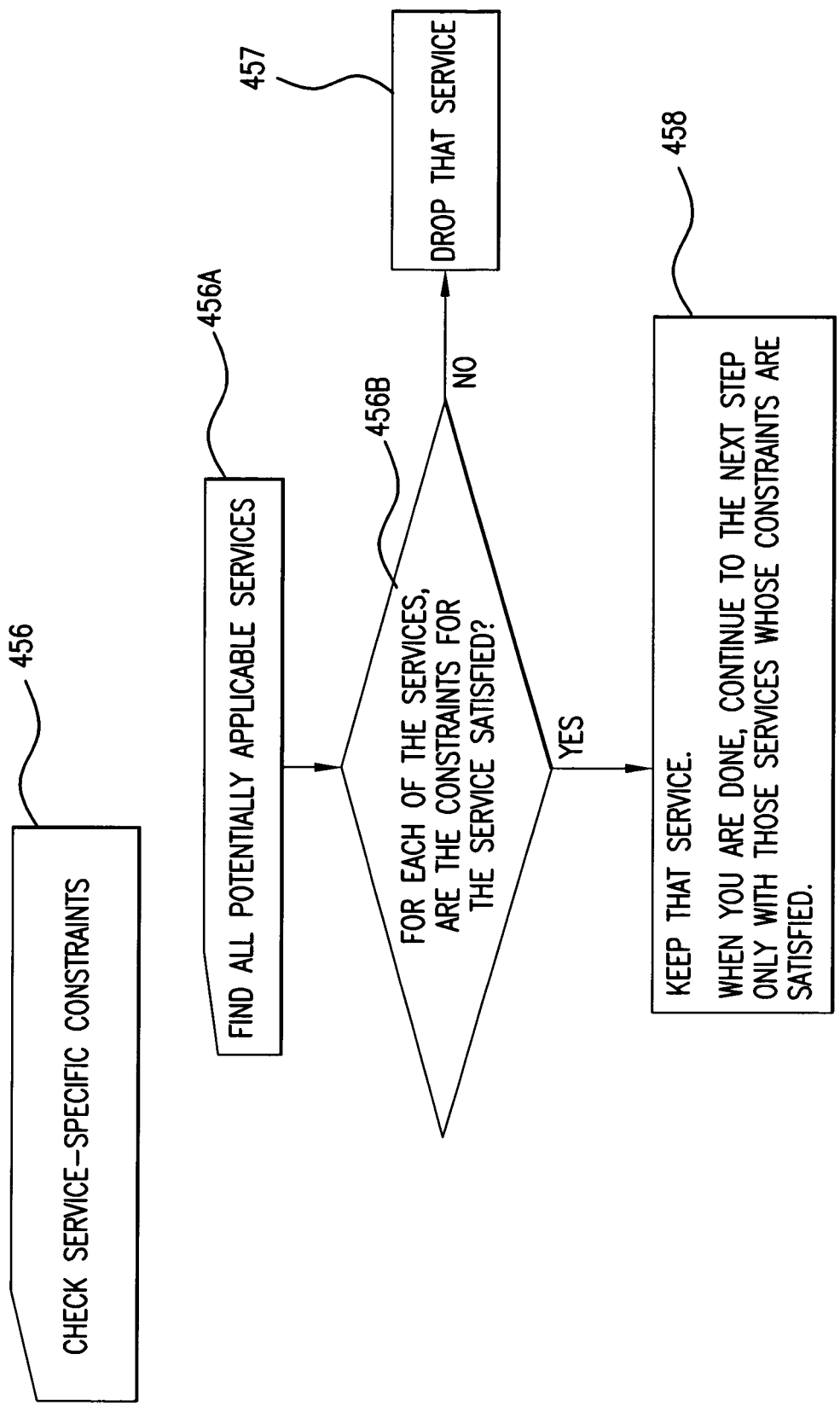

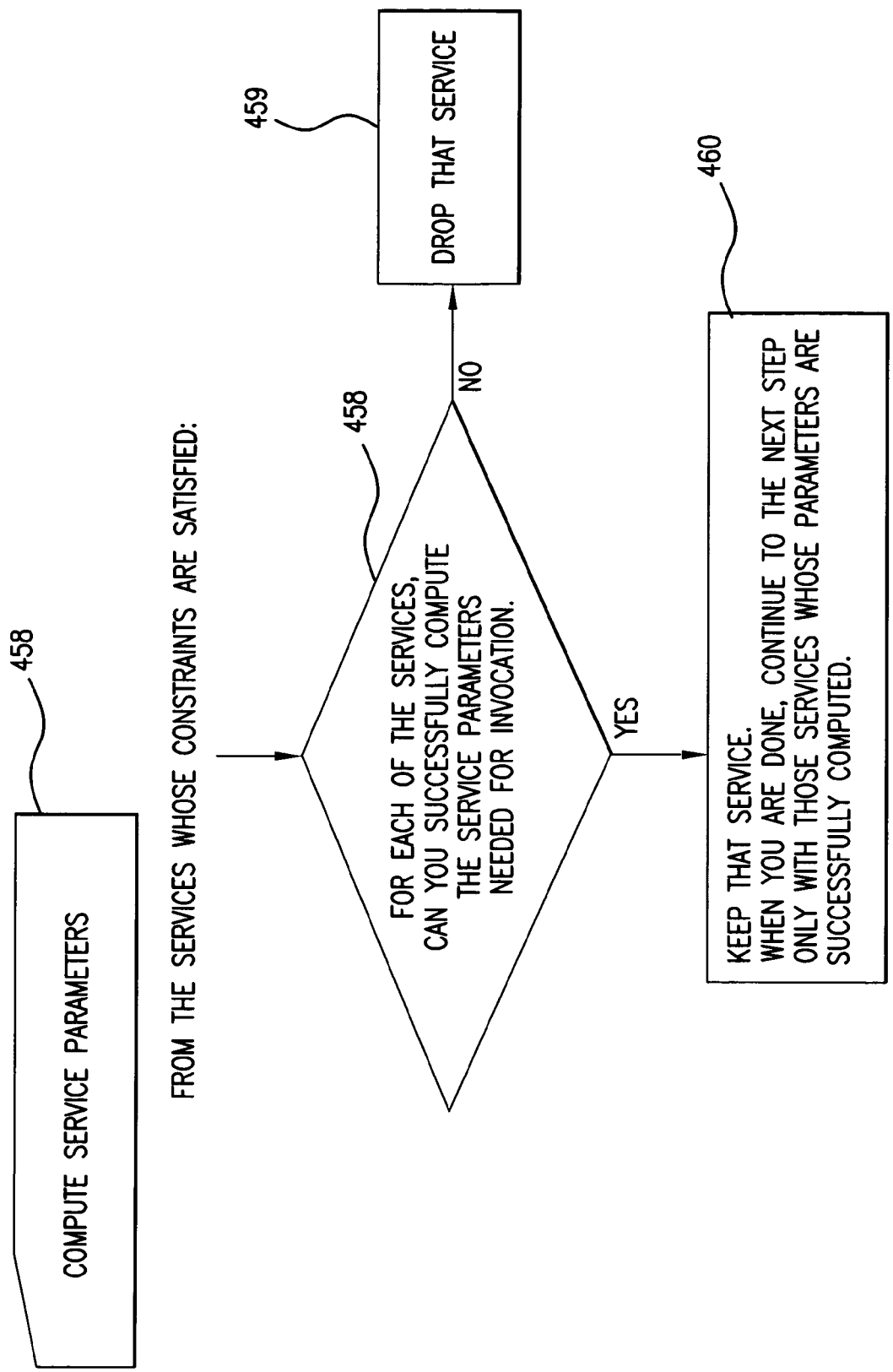

EVENT-DRIVEN AND LOGIC-BASED DATA TRANSFORMATION

BACKGROUND OF THE INVENTION

The present invention relates to conversion and routing of data, and in particular to conversion and routing of data on a communications medium such as the World Wide Web (WWW) or the Internet.

The amount of content on the World Wide Web (WWW), as well as the number of users, continues to increase. Although the capacity of the network carrying electronic traffic between the WWW servers and users is also growing, this alone is not enough to avoid congestion on the Internet. Ways of optimizing the network usage are desirable.

Use of the WWW and of wireless communicators, such as telephones and electronic personal assistants, has increased and today these electronic communication techniques have begun to merge. At the same time, the number of different types of electronic devices used to access the WWW is also increasing. Optimizing network usage is even more beneficial in the wireless environment where the network connection's bandwidth is limited. Mobile devices may also have limited resources in comparison to desktop computers. For example, mobile devices often have smaller screens, a less powerful CPU, and less memory in comparison to regular desktop computers. The wireless network can also be less reliable and can be slower than a fixed network. Communication networks are particularly well suited to content adaptation services that can allow faster delivery of content as well as proper presentation on a wide range of devices, whether wireless or otherwise.

Communications networks typically include servers that provide information and clients that access the servers to obtain information. Proxy servers may be used within a communication network to facilitate communication transactions. For example, proxy servers can perform caching functions to expedite delivery of content. A proxy generally transmits data between a client and a server in response to a user request for content. A client that would usually communicate directly with a server can instead contact a proxy. The proxy can then contact the server that holds the requested information. After receiving the client request, the proxy can open a connection to the server and transmit the request to the server. The proxy waits for a response from the server, which the proxy transmits to the client.

Proxies can also enable communications between a client and a server that cannot communicate directly, and/or provide enhanced functionality to client/server communications. For example, a proxy may cache server responses to specific requests. By caching server responses, if the request is repeated, a response may be returned directly by the proxy without making a new connection to the server. Proxies can also be used to alter the data flows between a client and a server.

It may be more desirable to deploy some services in proxies rather than in origin web servers. Proxies may include services that facilitate adaptation of content and enhance web page access performance. The Open Pluggable Edge Services (OPES) environment allows services to be added at the proxy server that can extend the functionality of the proxy server. For example, OPES can enable proxy servers to provide services that mediate, modify and monitor object requests and responses.

The OPES architecture is described in "*Extensible Proxy Services Framework*" *Internet-Draft: draft-tomlinson-epsfw-00.txt* by G. Tomlinson et al. which is herein incorporated by reference in its entirety. FIG. 1 shows an example of the OPES architecture including a user agent 110, a caching proxy server 120, and a content server 130. An OPES engine is typically implemented at the caching proxy server 120. The OPES engine defines only four external execution points known as client request 1, proxy request 2, origin server response 3, and proxy response 4. The client request 1 represents a request by a client 110 or "user agent" to the caching proxy 120 on an inbound flow. The proxy request 2 represents a request by a caching proxy 120 to a content server 130 on the inbound flow. The origin server response 3 represents a response from a content server 130 to the caching proxy 120 on an outbound flow. The proxy response 4 represents a response from a caching proxy 120 to the client 110 on the outbound flow. The flow of HTTP user request messages and response messages between the user agent 110, the caching proxy 120, and the server 130 is represented by arrows. A user request for content is typically generated by a client/user agent 110 when a user either types a URL in a browser or clicks on a hypertext link. When the user request reaches the caching proxy server 120, the caching proxy server 120 can retrieve requested data or content from a cache in the caching proxy server 120 if the requested data or content is already available at the caching proxy server 120. If the requested data or content is not already available at the caching proxy server 120, then the caching proxy server 120 forwards the user request to the origin server 130 containing the requested data. When the content is retrieved, the proxy server 120 forwards the data to the user agent 110.

An OPES environment is typically implemented in the proxy server 120. Services are defined with proxylets and rule modules together with general services provided by the proxylet library. A proxylet is an executable code module that has a procedural interface to core services of a caching proxy. An event can occur at any of the four execution points that triggers a proxylet to process the message. Proxylets may either be downloaded from content servers or user agents or may be preinstalled on a caching proxy. A proxylet library is a language binding dependent API on the service environment caching proxy platform with which proxylets link. A proxylet library can provide a standardized and strictly controlled interface to a service execution environment on the proxy.

The OPES environment also adds message parsers, a rule processor, and sets of actions. The message parser (not shown) processes the message stream flowing between the client 110 and the content server 130 and can extract message properties relevant to a rule base. These message properties can then be fed through the rule processor (not shown) with an appropriate rule module. The message parser is thus responsible for interpreting messages received, isolating salient elements as message properties, and causing actions to be activated when appropriate. When a trigger occurs, an event context is established containing the relevant properties isolated by the message parser.

The rule processor is invoked by the message parser at an event and is responsible for activating applicable rules in a rule base. The rule processor activates a rule by determining whether the pattern of the rule matches the event properties in a given event context, and if so, invoking the corresponding action. A rule base can include a collection of rule modules. Each rule module can include a set of rules. Each rule comprises a pattern and an action. A pattern is an expression that can be evaluated with respect to the message properties in an event context. Actions can identify proxylets, built-in proxy library functions or remote call outs that can modify operation of the service environment caching proxy.

The rules will either match or fail to match the properties in a particular event context. A rule is matched if the message properties match those specified in the rule. The matching of a rule results in a trigger that causes an action to occur, such as execution of a proxylet, an action built into the proxylet library, or a call out to a remote call out server for help processing the message. Salient components of the message are passed to the proxylet, built-in action function, or to a remote call out server via a network protocol.

Proxylets, built-in actions, or remote callout servers may inspect, add, delete, and modify the properties of messages identified by message parsers, within constraints defined by the message parser. The results of processing are passed back to the service execution environment for disposal. The service execution environment may cache the result or throw it away and send an error message to the user agent or content server. After action execution is completed, the service execution environment does not modify the message further.

The OPES architecture is relatively rigid in that OPES defines a fixed set of four processing points. Moreover, OPES allows only externally visible processing points because OPES is concerned with interoperability of implementations from different vendors. The rigidity of the OPES architecture can make scaling difficult. Another constraint of the OPES architecture is that OPES requires its own message parser, a current HTTP address and RTP/RTSP messages.

Most knowledge-based systems evaluate all the facts and rules in all circumstances. This method is general and comprehensive, but can result in poor performance. The OPES architecture has a rule base that includes only a fixed set of simple default rules that dictate the order in which different services should be applied. OPES rules are relatively loose and message-oriented, and the logic of the rules is procedurally expressed. For example, an OPES rule can read: if message X is received, and if it has attribute Y, do action Z. Application of these rules typically depends on the direction a message is flowing (inbound/outbound) and who is the owner of the rules, for example, a client, a content author, or a service provider. The OPES rule processor starts out with a set of all rules and narrows the set of all rules to a subset of rules applicable in the particular processing point. At run time, an OPES rule specifies which processing point is associated with that particular OPES rule. Thus, the OPES rule processor evaluates all rules in a rule base. When the rule base is very large, serially searching through all of the known rules can be inefficient.

There is a need for systems that can efficiently adapt or transform content for presentation on a variety of end user devices.

SUMMARY OF THE PREFERRED EMBODIMENTS

An aspect of the present invention provides a data transformation module adapted to transform requested data that flows between a client and a server. The data transformation module can include a plug-in module, content adaptation logic including an inference engine, and data transformation service modules. The plug-in module integrates with a computing node located between the client and the server, and monitors data flow between the client and the server. In response to an event or a message in an inference point, the plug-in module generates a query to the content adaptation logic. A plurality of data transformation service modules are provided. Each of the data transformation service modules transform requested data into transformed data adapted for receipt by a client. The content adaptation logic can include the inference engine associated with the plug-in module and the plurality of data transformation modules and controls data transformation services. In response to the query generated by the plug-in module, the inference engine evaluates the content adaptation logic, and determines which data transformation services to execute. A knowledge base is also associated with the content adaptation logic. The knowledge base includes data and rules for making a transformation decision. The data and rules can be segmented with respect to a selected inference point such that only selected rules are applicable at a selected inference point. When the inference engine receives the query from the plug-in module in an inference point, the inference engine can examine the knowledge base to determine which actions to perform in that inference point. These actions can comprise data transformation services.

Another aspect of the present invention provides methods of transforming requested data from a server requested by a client. Inference points can be defined, and whenever an inference point is encountered an inference engine is invoked to determine applicable data transformation services at that particular inference point. The inference engine may also compute parameters required for invocation of the applicable data transformation services, and if the parameters required for invocation of the applicable data transformation services are successfully computed, the applicable data transformation services can be applied to the requested data to transform the requested data into transformed data.

Another aspect of the present invention provides methods of transforming requested data that flows between a client and a server into transformed data. A knowledge base is provided that includes service rules. Specific service rules are associated with particular inference points. Data flowing between a client and a server is monitored for an event. An inference engine is invoked when an inference point is encountered. The knowledge base is examined to determine selected ones of a plurality of data transformation services that are applicable in a certain context to transform the requested data into transformed data. The only service rules that are examined are the specific service rules associated with the inference point encountered.

Another aspect of the present invention provides a computer network that can include a server that includes data and a client that requests data from the server. A computing node is located between the client and the server. The computing node includes at least one inference point associated therewith. Each inference point can have at least one content adaptation service rule associated therewith. A data transformation module adapted to transform requested data that flows between the client and the server into transformed data is integrated with the computing node. The data transformation module can be similar to the data transformation module described above. The computing node could be a caching proxy server, the client, and/or the server.

Another aspect of the present invention provides a computer network that can include at least one server that includes data and at least one client that requests data from the server. A plurality of computing nodes are located between the client and the server. Each of the computing nodes can include at least one inference point associated therewith. Each inference point has at least one content adaptation service rule associated therewith. A plurality of data transformation modules each adapted to transform requested data that flows between the client and the server into transformed data are integrated with at least some of the plurality of computing nodes. The data transformation modules are preferably coupled to selected ones of the plurality of computing nodes, such that the requested data is transformed at each of the selected ones of the plurality of nodes. Each of the data transformation modules can be similar to the data transformation module described above. The computing node could be a caching proxy server, the client, and/or the server.

BRIEF DESCRIPTION OF THE DRAWINGS

Aspects and various advantages of the present invention are described below with reference to the various views of the drawings, which form a part of this disclosure.

FIGS. 2, 3, 4A, and 4B show block schematic diagrams of approaches selected by embodiments of the present invention for adapting the same content to different physical and logical environments in navigating the Web.

FIGS. 4C through 4H show flow charts illustrating methods of transforming requested data according to preferred implementations of the present invention.

DETAILED DESCRIPTION OF THE PREFERRED EMBODIMENTS

Figure 1:
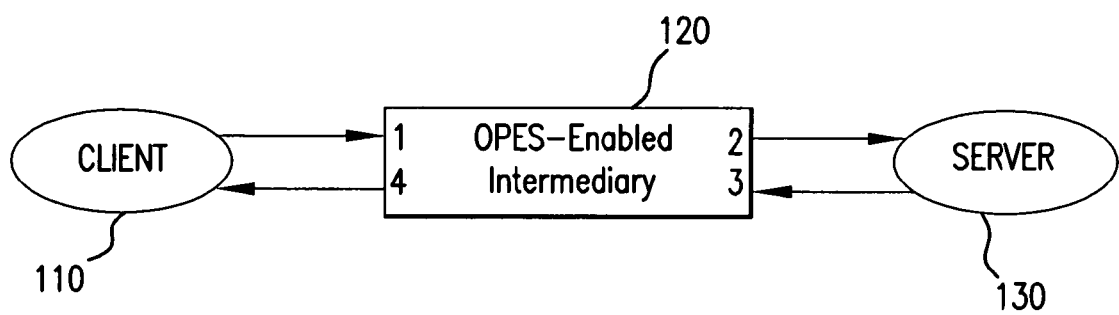
FIG. 1 shows a block schematic diagram of a conventional approach for adapting the same content to different physical and logical environments in navigating the Web.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used throughout the detailed description, the term "module" can refer to a clearly identifiable part of a system with well-defined functionality and interface capability to other modules. Modules can include software modules that are part of a software system with well-defined sub-functionality. Modules can also include, but are not limited to software blocks, component units and/or subsystems.

Modules in the OCAE system can include knowledge data bases that keep knowledge about user agents, devices and URLs, inference engines adapted to process rules, content-adaptation service modules adapted to perform well-defined transformation functions, content adaptation service logic that can define when specific content-adaptation service modules should be implemented.

As used throughout the detailed description, the term "intermediary" can refer to a computing node. The intermediary could be, for example, a proxy server or a dedicated application server. Although the description below assumes that a proxy server is used as the intermediary, the embodiments of the invention can also be implemented on other types of intermediaries. Thus, the present invention described herein is generally independent of any particular intermediary. The term "transformed data" refers to data that is adapted for use by an end user device, such as, but not limited to, a wireless communicator, a handheld computer, a personal digital assistant, and a cellular radiotelephone. Unless noted otherwise, the term "server" refers to any unit that provides content, data or services over a network to one or more clients. The server referenced herein can be any type of server, for example, a WWW origin server such as an Internet server, rapid-access directory server and/or database server with query access. The term "client" refers to any unit that requests content, data or services. Throughout the description, the term "client" may be used either in conjunction with or interchangeably with the term "user agent", and "browser". As used herein, the term "data" refers to any representation of information that serves as either input to or output from a computer. Examples of data can include WWW content, picture files, sound files, numbers, letters, symbols, and analog and digital quantities. Throughout the description, the term "transform" may be used either in conjunction with or interchangeably with the term "adapt". In the drawings, unless noted otherwise, arrows represent the flow of HTTP request and response messages between a client, intermediary, and server.

The description below discusses many concepts, specifications and standards. The specifications and standards to which this description refers are described on the web site of the Internet Engineering Task Force (IETF) at the URL http://www.ietf.org.

The goals of OPES and OCAE are different in that OPES addresses incorporation of all possible edge services while OCAE addresses only content adaptation services and routing of data in conjunction with adaptation. Thus, with regard to content adaptation and routing, OCAE is more sophisticated and specialized. Preferred implementations of the Open Content Adaptation Environment (OCAE) can provide extensible methods and systems that can enable efficient adaptation of data, such as content or information, on the World Wide Web (WWW) for delivery to end users, such as clients or other user agents. Preferred implementations of this invention can provide faster, customized delivery of the content to clients or user agents who access the WWW from any computer through any Internet connection.

Implementations of preferred aspects of the present invention can adapt data currently existing on web sites for processing in a wide variety of applications. Although the use of preferred implementations of this invention is not limited to mobile users, preferred implementations of this invention can be utilized by mobile users that access the Internet using handheld wireless communicators over a narrow-band wireless network or by various other devices having limited capabilities. For instance, some implementations can also produce data for use by portable telephones or personal digital assistants accessing the Internet. Preferred implementations can also allow adaptation of original data or content to a form better suited for the device used by the client or user agent, if needed.

Conventional approaches to Content Adaptation (CA) tend to program CA logic in a procedural fashion. Programming the content adaptation logic procedurally can not only make it difficult to understand, but also can make debugging, modification and extension thereof very difficult. Conventional content adaptation logic is too complex in part because there are many types of content, content adaptation parameters, content adaptation services, and execution contexts. For example, some possible content types can include HTML, WML, XML, images, flash, pdfs, applets, or streaming media. Content adaptation parameters can be both static and dynamic. The parameters that must be considered vary depending on the particular type of device and capabilities of that device, the type of user-agent or client using that device, and the preferences of the particular user-agent or client. Network characteristics, such as bandwidth and delay, can also vary. The types of CA services can include, for example, numerous types of clippings, compressions, rewritings, annotations, and image manipulations.

In particular, the wide variety of content, content adaptation parameters, content adaptation services, and execution contexts can make it difficult to know which content adaptation services should be applied and when those content adaptation services should be applied. To resolve these problems, preferred implementations can provide a modular and scalable architecture in which CA logic and CA services can be separate components. CA logic can determine what adaptations or transformations should be performed on content, as well as the order and timing at which those adaptations or transformations should be performed. CA logic is preferably implemented in an extensible way to cope with future changes. CA services are preferably optimized for fast transformation of content.

CA services can perform the actual adaptation or transformation of content.

Preferred Implementations of Data Transformation Modules

An aspect of the present invention provides a data transformation module adapted to transform requested data that flows between a client and a server into transformed data. A plug-in module adapted to be integrated with a computing node located between the client and the server is provided. The plug-in module is adapted to monitor a data flow between the client and the server. In response to an event or a message in an inference point, the plug-in module generates a query. A plurality of data transformation service modules are provided. Each of the plurality of data transformation service modules is used to transform the requested data into transformed data. An inference engine is associated with the plug-in module and the plurality of data transformation modules. A knowledge base is associated with the inference engine. The knowledge base includes data and rules for making a transformation decision. The rules can be segmented with respect to a selected inference point such that only selected rules are applicable to the selected inference point. When the inference engine receives the query from the plug-in module in inference point, the inference engine can examine the knowledge base to determine whether at least one action is to be performed at the at least one inference point.

The data transformation module is adapted to be integrated with at least one of a plurality of computing nodes through which HTTP requests and responses travel. The at least one inference point defines states and events in the at least one computing node. The at least one inference point can preferably include a plurality of inference points. For example, the plug-in module can be adapted to be coupled to a proxy server to monitor HTTP traffic for events and to notify the inference engine when inference points are encountered. The query is generated based on a state of a particular inference point.

The plurality of data transformation service modules are associated with the plug-in module and the inference engine. Each of the plurality of data transformation service modules is adapted to perform at least one data transformation of a plurality of data transformations on the requested data.

Selected ones of the plurality of data transformation service modules are applied to transform the requested data.

The inference engine determines that the data transformation module is to perform at least one action. That action can comprise determining selected ones of the data transformation service modules that are applicable in a certain context to transform the requested data into transformed data. The requested data can be, for example, WWW content. The inference engine is preferably logic-based. In determining the applicable data transformation service modules, the inference engine preferably examines only the selected rules and data relevant to those selected rules. Thus, the at least one inference point can cause the inference engine to determine zero or more of the data transformation service modules applicable in a given context. In other words, the at least one inference point typically causes the inference engine to determine at least one of the data transformation service modules applicable in a given context. However, in certain instances, none of the data transformation service modules will be applicable in a given context, and the plug-in module will move on to the next inference point without performing any action. If the at least one action is to be performed, then the at least one action can further include application of the data transformation service modules to transform the requested data into transformed data. Alternatively, if the at least one action is to be performed, then the at least one action can comprise application of a plurality of data transformation service modules to transform the requested data into transformed data. If the at least one action is to be performed, then the at least one action can also include determining an order in which applicable ones of the data transformation service modules are to be applied to transform the requested data. If the at least one action is to be performed, then the at least one action can also comprise monitoring the requested data and/or modifying the requested data. The plurality of data transformation service modules is scalable such that new data transformation service modules may be added. The inference engine can also be adapted to issue a message indicating why selected ones of the plurality of data transformation service modules are to be applied at specified times.

The knowledge in the knowledge base can include content adaptation parameters and content adaptation service rules used to determine whether the at least one action is to be performed. The selected rules can be selected ones of the content adaptation service rules associated with a particular inference point. The content adaptation parameters may include, for instance, a database of supported user agents, a database of URLs that should not be transformed for content adaptation, a database of available CA services including service constraints and service parameters of each CA service, a database of CA service level specifications for services configured in several different levels, a database of service exception rules that specify exceptional cases when services should not be applied, a database of available scripts for content clipping and text transmation and associated constraints, and a database of mime types and associated file suffixes. The content adaptation service rules determine the applicability of a particular service module. The content adaptation service rules can each include at least one constraint associated with the content adaptation service rule. Alternatively, particular content adaptation service rules can include zero constraints associated therewith, in which case that particular service should always be applied. A particular content adaptation service rule is applicable only if all constraints associated with that rule are satisfied and no exception rules associated with that service are triggered. Selected ones of the content adaptation service rules preferably are associated with each inference point such that only selected ones of the content adaptation service rules are evaluated at a particular inference point. At each inference point, the inference engine examines the knowledge base to determine whether service-independent preconditions, constraints of applicable content adaptation service rules, and content adaptation parameters are satisfied, and applies service composition logic to decide in which order services should be applied if multiple services are applicable. The knowledge base is preferably extensible.

According to another aspect of the present invention, a computer network is provided that can include a server that includes data and a client that requests data from the server. A computing node is located between the client and the server. The computing node includes at least one associated inference point. Each inference point preferably has at least one associated content adaptation service rule. A data transformation module adapted to transform requested data that flows between the client and the server into transformed data is integrated with the computing node. The data transformation module can be similar to the data transformation module described above. The computing node could be a caching proxy server, the client, and/or the server.

According to another aspect, a computer network is provided that can include at least one server that includes data, and at least one client that requests data from the server. Computing nodes are located between the client and the server. Each of the computing nodes can include at least one inference point associated therewith. Each inference point has at least one content adaptation service rule associated therewith. A plurality of data transformation modules each adapted to transform requested data that flows between the client and the server are integrated with at least some of the plurality of computing nodes. The data transformation modules are preferably coupled to selected ones of the plurality of computing nodes, such that the requested data is transformed at each of the selected ones of the plurality of nodes. Each of the data transformation modules can be similar to the data transformation module described above. The computing node could be a caching proxy server, the client, and/or the server.

The following is a description of some of the possible OCAE architectures that may be used in preferred implementations.

OCAE Architectures

Figure 2:
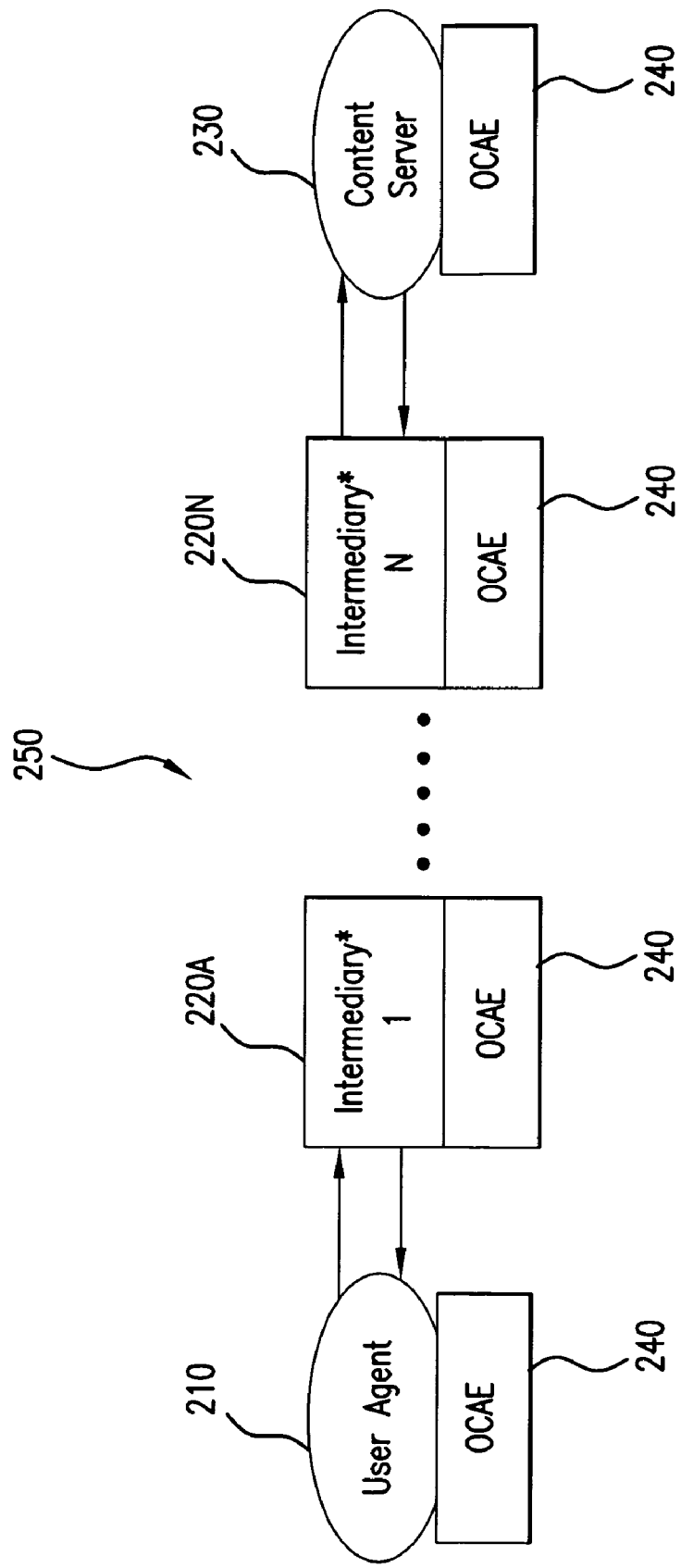

The Open Content Adaptation Engine (OCAE) will now be discussed with reference to FIGS. 2 and 3. As shown in FIGS. 2 and 3, the OCAE 240, 340 is an add-on that can be plugged into any intermediary computing node 210, 220A . . . 220N, 230 between a client user agent 210, 310 and a server 230, 330. As shown in FIG. 4A, the intermediary computing node 220A . . . 220N, 320A . . . 320N can be, but is not limited to, a caching proxy server 420. The OCAE 240, 340 can also be placed on a WWW server 230, 330 or a client user agent 210, 310. As shown in FIGS. 2 and 3, chain 250, 350 of computing nodes 210, 220A . . . 220N, 230, 310, 320A . . . 320N, 330 each having an OCAE 240, 340 can also be constructed. As requested data or content passes though the chain 250, 350, requested data or content will be transformed or adapted to correspond capabilities of the client user agent 210, 310 and/or other network characteristics. In particular, the OCAE 240, 340 can monitor normal HTTP traffic for content or data flowing between the client 210, 310 and the server 230, 330. If necessary, the OCAE 240, 340 can then apply any of a number of transformations on the data before delivering the transformed data to the client or user agent 210,310.

A detailed description of one embodiment of the OCAE will now be described with reference to FIG. 4A. In the following description, the OCAE 440 is configured on a single caching proxy server 420. However, this particular preferred embodiment is exemplary only, and as noted above the Open Content Adaptation Engine (OCAE) can be implemented at any or all computing nodes between a server and a client user agent.

Single OCAE Configuration

FIG. 4A shows a system including a user agent 410, a caching proxy 420, and a server 430. In the preferred implementation, an Open Content Adaptation Engine (OCAE) 440 is implemented at the caching proxy 420. The flow of HTTP user request messages and response messages between the user agent 410, the caching proxy 420, and the server 430 is represented by arrows. The flow of messages constitutes various events in the system. Each of these events is associated with well-known states in the system. There are both internal states and external states. Some of the inference points 1, 2, 3, 4 in FIG. 4A represent some possible external states. These particular inference points can correspond to the four processing points used in the OPES. Events associated with these external states are client request 1, proxy request 2, server response 3, and proxy response 4, respectively. Internal states and internal events can be defined which are only observable inside the computing node. States and events will be discussed below.

A user request 1 is typically generated by a client/user agent 410 when a user either types a URL in a browser or clicks on a hypertext link. When the user request 1 reaches the caching proxy server 420, if the requested data or content is already available at the caching proxy server 420, the caching proxy server 420 can retrieve requested data or content from a cache in the caching proxy server 420. If the requested data or content is not already available at the caching proxy server 420, then the caching proxy server 420 can forward a proxy request 2 to the origin server 430 containing the requested data. When the content is retrieved, the server response 3 is sent to the proxy server 420. The proxy server 420 can forward the data to the user agent 410. The individual components of the OCAE 440 are illustrated in FIG. 4B.

Figure 4B:
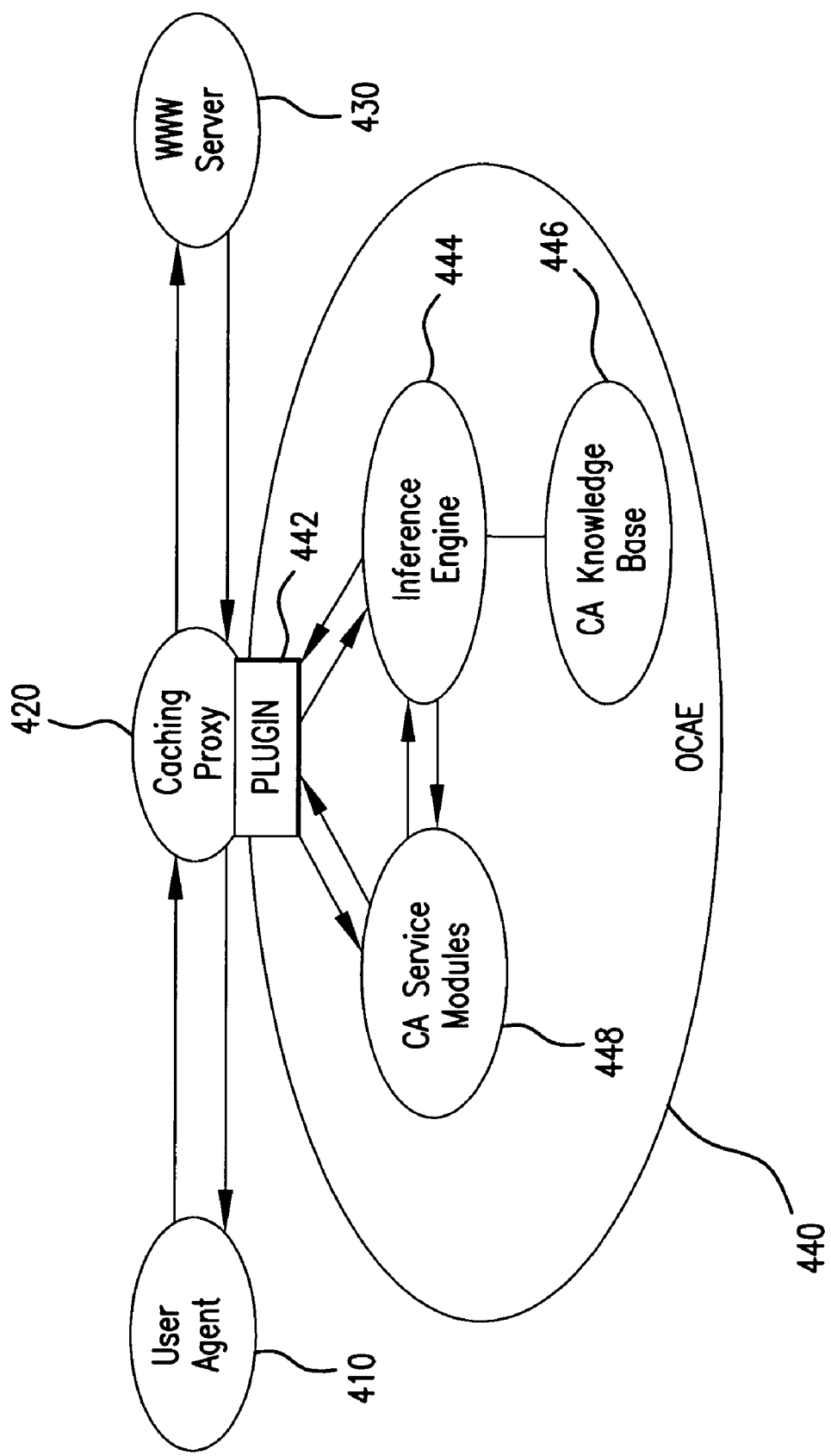

FIG. 4B illustrates preferred implementations of the OCAE 440 shown in FIG. 4A. The OCAE 440 can comprise a plug-in module 442 integrated with at least one intermediary node, an inference engine 444 with an associated Content Adaptation (CA) knowledge base 446, and a plurality of CA service modules 448. Preferred implementations of the OCAE 440 can be viewed as an advisor model since applications (e.g., the plug-in and CA services) can issue various queries to inference engine 444 in various processing or "inference" points and then decide to follow or ignore the advice from the inference engine 444. The plug-in module 442, logic inference engine 444 with content adaptation (CA) knowledge base 446, and plurality of CA service modules 448 will be described in detail below following a description of states, events and inference points that can preferably be used by embodiments of the present invention.

States and Events

States and events can be used to structure the flow of a software program. A software program typically specifies a large number of states with associated events which can occur in those states. States may be used to define something in terms of configuration, attributes, conditions, or information content. The number of possible states the OCAE 440 may exhibit may theoretically be infinite. Events are occurrences that trigger transitions from one state to another.

For example, as shown in FIG. 4B, numerous external states are defined at the intermediary node 420 with the plug-in 442. State 1 is responsive to a new request from a user. A new request from a user switches the intermediary plug-in to state 1 from an undefined initial state. Thus, the event that can trigger transition to state 1 to another state is a new request from a user. This request could be, for example, a mouse click by a user on a web browser to go to another website. After some unspecified processing, the intermediary/plug-in transitions to state 2. At state 2 the plug-in 442 decides to forward the request to an origin server 430 that contains the requested data or content. At state 3, the user agent 410 waits for the requested content from the origin server 430. In state 3, arrival of the content from the origin server is the event that can trigger more actions inside the plug-in 442. The actions will be discussed at length below. At state 4, the plug-in 442 is ready to send the data or content to the user agent 410 or client who requested it.

According to preferred implementations of the present invention, both external states and internal states may be defined. The external states may include, for example, 1, 2, 3, and 4, shown above.

As pointed out above, depending on the function the software should perform, a programmer can define a theoretically limitless number of internal states and events. For example, inside the plug-in between external state 3 and external state 4, any number of internal states and events can be defined. However, when the number of states/events becomes large, control of the software can be very difficult.

Inference Points

To help control the software, preferred implementations of the present invention can utilize inference points. Inference points are a subset of well-defined states that are defined with respect to particular computing nodes. In preferred implementations of the present invention discussed herein, the number of inference points is extensible, as the OCAE allows additional internal inference points to be defined as needed.

The OCAE includes a large number of potentially applicable rules. For example, rules can be service rules that include, but are not limited to, rules about image transformation, text transformation, and HTTP header manipulation. In preferred implementations of the present invention, at each inference point, rules are segmented into a subset of applicable rules. Each inference point typically has at least one rule (and typically a number of rules) associated with that inference point. Inference points can also be left open such that no rules are associated with a particular inference point at creation. These open inference points can then be defined for use with future rules.

As noted above, in each inference point, rules are segmented into a subset of applicable rules. For example, an early examination of the user agent (e.g., browser) can be done in inference point 1. Since inference point 1 is the point where the user request is received, the capabilities of the client or user agent can be examined only at inference point 1 to determine whether or not to continue. For instance, if it is determined that an unknown client or user-agent is present, or that client or user agent does not support any of the content types that the transformation services generate, then processing can be stopped for this user agent. Otherwise, processing can continue to the next step. For example, the evaluation of constraints and parameters for the image compression takes place only at inference point 3. Since the image compression service can be applied only after the requested data or content is received at inference point 3. Thus, the constraints and parameters for the image compression service are only evaluated at inference point 3.

By dividing the set of rules into subset of applicable rules at each inference point, the searching efficiency of the OCAE can be increased. Inference points can be generated either explicitly by a programmer or by an intelligence module. In preferred implementations of the present invention, inference points are well-defined states that are explicitly declared in software by a software designer. For example, when inference points are explicitly declared, the programmer can explicitly declare which rules could be applicable in specific inference points. On the other hand, an intelligence module could also be used to determine which rules should be associated with a particular inference point.

Thus, in contrast to the processing points used in the OPES, the OCAE utilizes inference points. OCAE can allow a user to define any number of inference points depending on the state of the intermediary node where OCAE is integrated via a plug-in. Moreover, because OCAE is integrated with the intermediary node via a separate plug-in, discussed below, OCAE can allow both internal and externally visible inference points.

Use of Inference Points by Preferred Implementations of the Invention

The plug-in module 442 can be used to monitor data flowing through a particular computing node for an inference point. The inference points correspond to various points in the software execution or "states" that can allow the plug-in 442 to communicate or issue a "query" to a logic based inference engine 444. When the inference engine 444 is called by the plug-in module 442 in a certain inference point, the inference engine 444 knows the exact state of the plug-in module 442. In response, the inference engine 444 can perform logical inferences at these points. The inference engine 444 can then collect any additional facts it needs and can infer which actions/transformations are needed as a next step. The inference engine 444 can then tell the plug-in module 442 about conclusions reached by the inference engine 444. For example, the inference engine 444 may tell the plug-in module 442 what actions are appropriate to perform in that particular state. If the plug-in module 442 receives an image file at point 3 that is too big for the user agent 410, then the OCAE 440 could tell the plug-in module 442 that the image file should be compressed. To accomplish this, the OCAE 440 provides various content adaptation services 448 associated with each of the inference points.

As pointed out above, each of the inference points can have a selected number of rules associated with that inference point. As a result, the inference engine 440 has to evaluate fewer rules when determining which content transformations should be performed since only selected rules are associated with a particular inference point. The use of inference points allows the logic in the inference engine 444 to be kept very simple. When the inference engine 444 is queried by the plug-in module 442, the inference engine 444 preferably knows the history of everything that has happened so far based on knowledge of the particular inference point at which the plug-in module 442 is invoking the inference engine 444. The inference engine 444 can then decide the next step.

When queried by the plug-in module 442, the inference engine 444 does not have to remember anything that happened in the past to infer the next action. In other words, the inference engine 444 is stateless since it does not need to remember states between service requests. Accordingly, the inference engine can make content transformations more efficiently in comparison to conventional inference engines. A description will now be provided of plug-in modules, content adaptation service modules, service composition modules, inference engines and content adaptation knowledge bases for use by preferred embodiments of the present invention.

Plug-In Modules

Preferred implementations of the present invention utilize a plug-in module 442 that can allow integration of the OCAE 440 with an existing intermediary node, such as the caching proxy server 420. The plug-in module 442 can monitor the flow of http traffic through the intermediary node for messages/events. The plug-in module 442 communicates with the inference engine 444 when an inference point is encountered. Preferably, the plug-in module 442 is allowed to call the inference engine 444 in response to a state defined by an inference point. The particular inference point allows the inference engine 444 to know the exact state of the plug-in module 442.

Thus, in contrast to using a separate message parser, OCAE can instead use a plug-in to hook up with a hosting intermediary node. As a result, OCAE can support any communications protocols supported by the intermediary node to which a plug-in has been attached. One application is adaptation of the web content, but OCAE can basically support any kind of content (for example, emails, instant messages, electronic news etc.)

Content Adaptation Service Modules

Individual Content Adaptation (CA) service modules 448 are used to perform at least one data transformation on the requested data from the server 430. Each CA service module 448 and the associated transformation service can be implemented as a separate component thereby making it easy to maintain a group of possible transformation services. Each CA service module 448 can be individually modified. Introduction of new CA service modules is also simple. Each CA service module 448 can be implemented, for example, using any object-oriented software development technology. Although an individual service module 448 can perform more than one transformation on the requested data or content, for simplicity this description will assume that an individual service module 448 performs only one transformation. In the event that multiple transformations are needed, the inference engine 444 will then determine the applicable service modules 448, as well as the order in which they should be applied.

Examples of Content Adaptation (CA) service modules 448 include, but are not limited to, lossless text compression service, image color reduction service, transformation service from one data format to another, for example, transformation from HTML to WML, transformation from JPEG to GIF, clipping of an HTML page to a subset of the page, text-to-speech transformation, adaptation of streamed audio and video for currently available band width and device capability, and content routing to a preferred device.

In some cases, certain service modules may be associated with particular inference points. However, other service modules can be called from multiple rules in different inference points.

Service Composition Modules

Service composition modules (not shown) may also be provided in the OCAE 440 to determine the order in which selected transformations should be performed. In other words, once the OCAE 440 has identified or selected the applicable CA service modules 448 whose constraints are all satisfied, the service composition module 448 can figure out the order in which the applicable service modules 448 should be executed to deliver a coherent service, by analyzing the dependencies among the applicable CA services (if any).

For example, if the requested content is in the form of an HTML page, the applicable CA services for transformation of the HTML page may be content clipping and compression. In this example, the service composition module would decide that content clipping (e.g., selecting a few sections of the page) must be done before compression since the original content cannot be clipped once the content has been compressed.

Inference Engine

As discussed above, inference engines are typically rules based. However, conventional inference engines typically evaluate all known rules using all known facts before making a decision about particular data transformations that should be applied. This can result in inefficiency and poor performance.

Unlike OPES, OCAE provides support for service composition. The OCAE inference engine allows for full customization of the service composition logic. This logic can exploit the dependencies among the services, and define the order in which the applicable services should be executed. Rules segmentation in OCAE can also provide better performance. OCAE has pre-segmented sets of rules, one per inference point. Thus, in comparison to the OPES architecture, the OCAE inference engine starts out with a much smaller set of rules. OCAE can take advantage of the underlying architecture and the domain-specific knowledge by using states of the intermediary and the inference points to determine which CA services make sense where. OCAE rules and OPES rules are structurally different. OCAE rules are more declarative, service-oriented, and relatively self-contained. For instance, an OCAE rule can read: Service Z requires message X and attribute Y. The combination of OCAE's service-oriented rules and the OCAE inference engine can allow for easier structuring and specification of the content adaptation logic.

For improved performance, preferred implementations of the OCAE 440 utilize a special-purpose inference engine 444 that works in conjunction with the states and events in a computing node. Since each inference point has only a selected number of rules associated with that inference point, the inference engine 444 does not need to evaluate all rules before making a decision about particular data transformations that should be applied. Instead, the inference engine 444 determines applicable rules/actions in each inference point thereby allowing the inference engine to evaluate far fewer rules when determining which content transformations should be performed. Furthermore, since the inference engine knows which rules to evaluate, the inference engine can selectively retrieve only those data needed to evaluate this set of rules, thereby allowing the inference engine to retrieve/evaluate for less data and/or facts. This can contribute to higher performance. Based on the particular inference point encountered, the inference engine can examine the knowledge base to determine at least one action to perform. The at least one action is typically a service such as one of the content transformations specified by a particular service module 448. In some cases, however, the inference engine may not find any rule whose constraints are all satisfied, in which case no action will be performed in that given inference point. The inference engine can perform content transformations much more efficiently in comparison to prior art inference engines. Inferencing for use by some preferred implementations of the inference engine is now described.

At each inference point, preferred implementations of the inference engine 444 can check service independent preconditions. For example, at point PI, the inference engine can check or examine the knowledge base to determine if the user agent or client is supported, if the user agent accepts supported media types, and/or if the URL is non-transformable. At processing point P3, the inference engine can check or examine the knowledge base to determine if the requested content has already been transformed, if the content length is zero, if the content encoding is known or unknown, if the user has image preferences or the HTTP response status.

At each inference point, preferred implementations of the inference engine 444 can then check service specific constraints of each potentially applicable service to determine which services are indeed applicable. For example, with respect to each of the potentially applicable services, the inference engine may check or examine the knowledge base to determine it there is an exception condition as specified in one of the knowledge bases. If so, the service would be discarded. Similarly, the inference engine may check or examine the knowledge base to determine if the default service constraints are satisfied. If unsatisfied, the service would be discarded. Only those services whose constraints are satisfied are retained as selected services.

For each of the selected services, preferred implementations of the inference engine 444 then determine which service parameters, if any, are needed to call or invoke a particular service. For example, in each processing point, the service parameters required for actual invocation of the service are computed. If service parameters cannot be computed, then the service is discarded.

For those services for which parameter computation is successful, preferred implementations of the inference engine can then apply service composition logic to determine which transformations should be performed. The inference engine 444 can also apply the knowledge base 446 (described below) to infer when to do particular content transformations specified by the content adaptation service modules 448. If multiple services are applicable, the inference engine 444 can check the dependencies among the various services, and determine a logical order in which the services should be applied to the requested content. The service composition logic can then propose which services to invoke and the order to invoke them. For example, if the data (content) is a compressed text file, an "uncompress" service should be called first, followed by a "text transformation" service, and then finally a "compress" service should be called before sending the result to the client 410 or user agent 410.

Service composition logic can be implemented automatically via service composition modules within the inference engine. Based on the contents of the knowledge base 446', these service composition modules can determine and specify the order for applying selected ones of the these CA service modules 448 (i.e., particular content transformation services) so that the requested content can be properly transformed.

The inference engine 444 can also issue a message communicating why a particular transformation has been chosen. If the inference engine 444 determines that no service module is applicable, the inference engine 444 will tell the plug-in 442 that no transformation is applicable. If the inference engine 444 determines that an error is detected, the inference engine 444 will notify the plug-in 442 that an error has been detected. Further, if the particular service that is called is available on multiple machines, the inference engine 444 can determine which machine to use. The inference engine 444 may also explain why a particular transformation strategy is used. The inference engine 444 has an extensible knowledge base 446 associated therewith. A preferred implementation of this knowledge base 446 will now be described in detail.

Content Adaptation Knowledge Base

In preferred implementations of the present invention, the Content Adaptation (CA) knowledge base 446 is an extensible knowledge base that can be configured to include any data or knowledge relevant in making an intelligent decision about content adaptation (CA). Information in the knowledge base can include Content Adaptation (CA) parameters and Content Adaptation (CA) service rules. Examination of the knowledge base 446 by the inference engine 444 allows the inference engine 444 to decide which content transformations to perform.

Content Adaptation Parameters

CA parameters databases are part of the knowledge base 446 for the OCAE engine. CA parameters can be stored, for example, in a number of Prolog databases. CA parameters can include any parameters that can affect the content transformation decision. CA parameters can be used by the inference engine 444 in the decision making process to determine which transformations to perform on the requested data or "content". Although CA parameters are discussed at length below, some examples of CA parameters include, but are not limited to, capabilities of the user agent, current bandwidth of the network, personal preferences of the user, and pricing structure of the service.

Examples of CA parameter databases can include a database of supported user agents, a database of URLs that should not be transformed for some reason, a database of available CA services with their constraints and parameters, a database of CA service level specifications, a database of available text transformation scripts and their constraints, and a database of file suffixes and associated mime types. The database of supported user agents can specify all supported user agents. The database of URLs that should not be transformed for some reason specifies certain URLs that should never be transformed for content adaptation. The database of available CA services with their constraints and parameters can specify all available CA services including constraints and parameters (if any). The database of CA service levels can specify additional services configured in several different levels. The database of available text transformation scripts and their constraints can specify all the available text transformation scripts and their constraints (if any). The database of file suffixes and associated mime types can specify all the available MIME types and the associated file suffixes.

Logic of the OCAE can be extended by adding new CA parameters to the databases. For example, a new device specification could be added, or a whole new service could be added with associated constraints and parameters. The inference engine of OCAE can take care of the rest. An API or GUI can be provided to facilitate the inspection and/or administration of the CA parameters databases.

OCAE Services

CA service rules can also be included in the content adaptation (CA) knowledge base 446. For each CA service module a group of rules can be defined. This group of rules can describe what the service is capable of doing, and what the service requires in order to be applicable. The service rules can include any information that could affect the applicability of a particular service module. Although CA service rules are discussed at length below, some examples of CA service rules include, but are not limited to, state of the intermediary node, specific data in HTTP messages, type of content to be transformed, capability of the user agent being used, as well as any other constraints imposed by the service. All of these CA service rules are preferably located in the knowledge base. At each inference point, the CA service rules are segmented in that only a subset of all CA service rules are associated with a particular inference point. This improves efficiency of searches by the inference engine.

OCAE provides a number of built-in OCAE services that can be invoked directly by an application. Examples of these services can include plug-in services, administration services, and services intended for the use by the CA service modules. Plug-in services can be used by the plug-in module to monitor HTTP traffic through the proxy server where the plug-in is running, and to consult OCAE at various inference points. The plug-in can ask OCAE for advice in any inference point, and the plug-in services can then tell the plug-in module the result of the inferencing in that inference point. For example, the plug-in services can then tell the plug-in module what services (services) are applicable to the content. The service parameters are included in the service definitions in the knowledge database. The plug-in services can also tell the plug-in module what services have failed. The plug-in services can also let the plug-in module know whether an internal error (internal_error) has occurred inside the OCAE via an error message (error_msg). The plug-in services can also tell the plug-in module not to transform the requested content (dont_transform) for some reason, or that the requested content has already been transformed (already transformed), and therefore that no further adaptation is needed. For example, reasons the requested content would not be transformed can include: the user agent is not supported (unsupported_UA(UA)), the URL is identified as a no transform URL (no_xform_URL (URL)), the media of the requested content is unsupported (unsupported_media(Media_list)), and/or the content encoding is unknown (unknown_content_encoding(CE)).

OCAE can also provide an interface (check_service) to allow each service to consult the OCAE for additional checks and advice. The OCAE will check a service in a specific inference point, and for each service indicate whether the checking was successful.

Administration services are not tied to any specific inference point. Administration services can include a find all services (find_all_services) service that can find all CA services known to OCAE. The find all service then returns a service list (Service_list) of all the CA services found in the knowledge base of OCAE. For example, the Service_list could be [xf, xfimage, xfgzip]. The list contains no duplicate names. If no CA service is found, the find all service returns an empty list. Administration services can also include a find all scripts service (find_all_scripts) that can find all scripts found in the knowledge base and return a list of all of the script names found in the knowledge base. For example, the result, Scripts_list, could be ['MyScript', 'yourScript', 'This script', 'That script' ]. The list contains no duplicate names. If no text transformation script is found, it returns an empty list.

The Content Adaptation (CA) knowledge base 446 can include many other types of data. For example, other types of data that can be included in the knowledge base can include, but are not limited to, information about user agents (browsers), devices, transformation services, network characteristics, user-specific preferences, etc. Some of the databases included in preferred implementations of the present invention will now be described in detail with reference to FIG. 4C.

For example, a user agent database 446A (User-Agent-DB) can include knowledge about all user agents (i.e., browsers) and their capabilities, such as, which markup language a particular user agent supports. A text transformation script CA knowledge base 446B (script-DB) can include knowledge relating to which text transformation scripts are available or on what content are they supposed to apply. A no transform URL CA knowledge base 446C (No-transform-URLs) can include knowledge relating to certain URLs (websites) that are not to be transformed. A CA service knowledge base 446D (CA-Service-DB) can include knowledge relating to which content types each CA service module can be applied to or which parameters are needed when these CA services are invoked. A CA service level knowledge base (not shown) (CA-service-level-DB) can include knowledge relating to certain services that can be configured in many different levels.

Importantly, the CA knowledge base is "extensible" since the data or "knowledge" included in the knowledge base can easily be updated by the addition of new data and/or databases. Depending upon the needs of the system, any number of databases can be added to the CA knowledge base. For example, a CA service level knowledge base (not shown) (CA-service-level-DB) can be added that includes knowledge relating to the maximum number of colors in GIF images, compression level of text files, etc. A mime-type-suffix knowledge base (not shown) (Mimetype-suffix-DB) can be added that can include knowledge relating to which file suffixes (extensions) typically map to which content types (text, image, video, etc.). A server configuration knowledge base (not shown) (xf-server-DB) can also be added that can include knowledge relating to the number of transformation servers present and where each transformation server is running, the IP address of each transformation server, timeout limits of each transformation server, and other configuration information for each transformation server. A service exceptions knowledge base (not shown) (CA-service-exception-DB) can also be added that includes knowledge relating to conditions under which a default behavior for each service will be applied.

Foreign Predicates

The OCAE engine is a logically separate entity, and can be implemented in many different ways. The OCAE engine can be embedded in a "container" environment, rather than running as a separate process on a separate node. For example, in a solution where Inktomi's caching proxy server, Traffic Server, is used as an intermediary, one or more instances of the OCAE engine can be embedded in the plug-in for the Traffic Server (C++ environment), and another instance of the OCAE engine can be embedded in a separate container where the transformation service modules reside, for example, in a Java environment. A number of foreign predicates are provided in the container environment where the OCAE engine is embedded. The container environment preferably implements the foreign predicates to feed the OCAE engine with information about the current ongoing HTTP traffic and to provide helper functions. Possible foreign predicates can include general HTTP header access, shortcuts for frequently accessed headers, and predicates specific to the chosen text transformation technology.

Data Request by the User Agent not Necessary

In preferred implementations of the present invention, the flow of data (e.g., HTTP content) is typically initiated by a user request for data. In "push" applications, the data (content) is pushed to the user without the user requesting the data. In this scenario, the OCAE 440 can operate on the pushed data provided that the data passes through the computing node where OCAE 440 is connected. Thus, the OCAE 440 can also operate to blindly transform any content (as opposed to requested content) flowing between the origin server 430 and the computing node 420 where the OCAE 440 is connected.

Example of Operation of OCAE

When a user agent 410 accesses the WWW server 430, the user request for data and the subsequent response (either from the server 430 or the intermediary 420) pass through the intermediary 420. The plug-in module 442, attached to the intermediary 420, monitors all traffic passing through the intermediary 420. The plug-in module 442 then notifies the inference engine 444 whenever various well-defined states known as inference points are encountered. For each inference point (i.e., in each state), the inference engine 444 examines the associated knowledge base 446 to determine the best actions to perform. For example, actions can include monitoring original messages, modifying the original messages, and/or invocation of CA service modules to perform a transformation of the data or content. A sequence of multiple transformations could take place before the requested data is produced. The requested data can then be sent to the client user agent.

The following example illustrates how the inference engine determines which actions to perform at a particular inference point 3. At the inference point 3, the intermediary node 420 has received the requested data or content from the origin server 430. The inference engine must determine what to do with the requested data or content from the origin server 430. In response to the inference point 3, the plug-in module 442 calls inference engine 444, tells the inference engine 444 that the plug-in is in inference point 3, and asks the inference engine 444 what to do. Knowing that the plug-in is in inference point 3, the inference engine 444 examines the knowledge base 446, and determines that only a text transformation service and an image transformation service are potentially applicable. Based on the knowledge base, the inference engine 444 knows which services are potentially applicable in each inference point.

A service rule is defined in the knowledge base for each service. Each service rule specifies service constraints. Service constraints are conditions that must be satisfied in order for the particular service rule to be applicable. The inference engine can evaluate the service constraints for each service to determine which services are applicable in the current transaction. The result of this evaluation could be that all, some or none of these services are applicable.

An example of how the OCAE services might be implemented will now be described. In inference point 1, the plug-in module can call OCAE to get a list of all applicable services. The OCAE can then tell a result (services, [ ]) indicating that nothing needs to be done at this point. The plug-in module can then continue to inference point 2, for example, and then to inference point 3 where it receives an HTTP response. The plug-in module would then again call the plug-in services, and the OCAE would return a list of potentially applicable CA services at this inference point. For example, there may be two applicable services. The plug-in module can now call these two services, and when the services are finished executing, the plug-in module can send the transformed content to the original client/user agent.

For example, an end-user device of the client or user agent 410 may not support an original format of requested content if an end-user device has a screen size of 300×200 pixels, and an image being sent by the server 430 is 450×300 pixels. In this case, the inference engine 444 might use an image transformation service to reduce the size to fit the screen of the end-user device. The inference engine 444 might also change the encoding format of the image to allow display on the end-user device.

For purposes of this example, it is assumed that the constraints for the image transformation service are satisfied. At this point, service rule for the text transformation service would be discarded. If the constraints for any service are applicable in the current transaction, the inference engine can then infer the needed parameters for invocation of the service. In this example, the inference engine 444 can infer which parameters are required in order to call the image transformation service. For example, the inference engine 444 can infer the level of compression needed for the requested image file.

Content adaptation according to preferred implementations of the present invention is event-driven in that the flow of execution is guided by various events that happen during the course of HTTP request, transformation and response. The inference engine 444 is logic based in that it uses logical facts and rules to determine which transformations to perform and when to perform those transformations. OCAE is simple since OCAE separates the adaptation logic from the actual transformation tasks. The adaptation logic tells when to do which transformations. The adaptation logic is best expressed as a set of simple logical facts and rules. This adaptation logic can be implemented directly in a logic programming language. Separate CA service modules specify how to perform the actual transformations.

These various "logical" services for content adaptation (CA) can be provided in each of a number of inference points 1, 2, 3, 4. For example, given the content-type of an HTTP reply in inference point 3, the OCAE can figure out what CA services are applicable for that reply. The OCAE can also check, for example, all constraints that might be associated with a particular service. OCAE can also allow the user to define additional inference points as needed.

OCAE is efficient since OCAE allows well-defined states to be introduced throughout the entire lifecycle of the transaction from reception of the user request, to retrieval of the content, to transformation of the content, and finally to delivery of the final result to the user. In particular, the OCAE allows both externally visible states as well as internal states and events to be defined. Each state or "inference point" has a subset of applicable rules associated therewith. This subset of rules is selected from a set of all rules. The inference engine 444 evaluates only the small subset of applicable rules associated with the particular inference point. This segmentation of the rules according to the states reduces the search space for the rules, and can thus provide improved efficiency.

The OCAE is also extensible in that the knowledge base 446 can be updated by adding, for example, new CA parameters, new CA service rules and new inference points as needed. For example, new CA parameters, such as the characteristics of new devices, preferences of new users, etc. can be instantly added to the knowledge base. New methods to determine dynamically changing parameters such as the network bandwidth for a current connection can also be added. New CA service modules can easily be added since the service modules are implemented as a software component that are added to the OCAE knowledge base. New inference points (i.e. states and events) can also be defined in the plug-in to steer the flow of the content transformation process.

Methods of transforming the requested data according to preferred embodiments of the present invention will now be described with reference to FIGS. 4C through 4H.

Figure 4D:
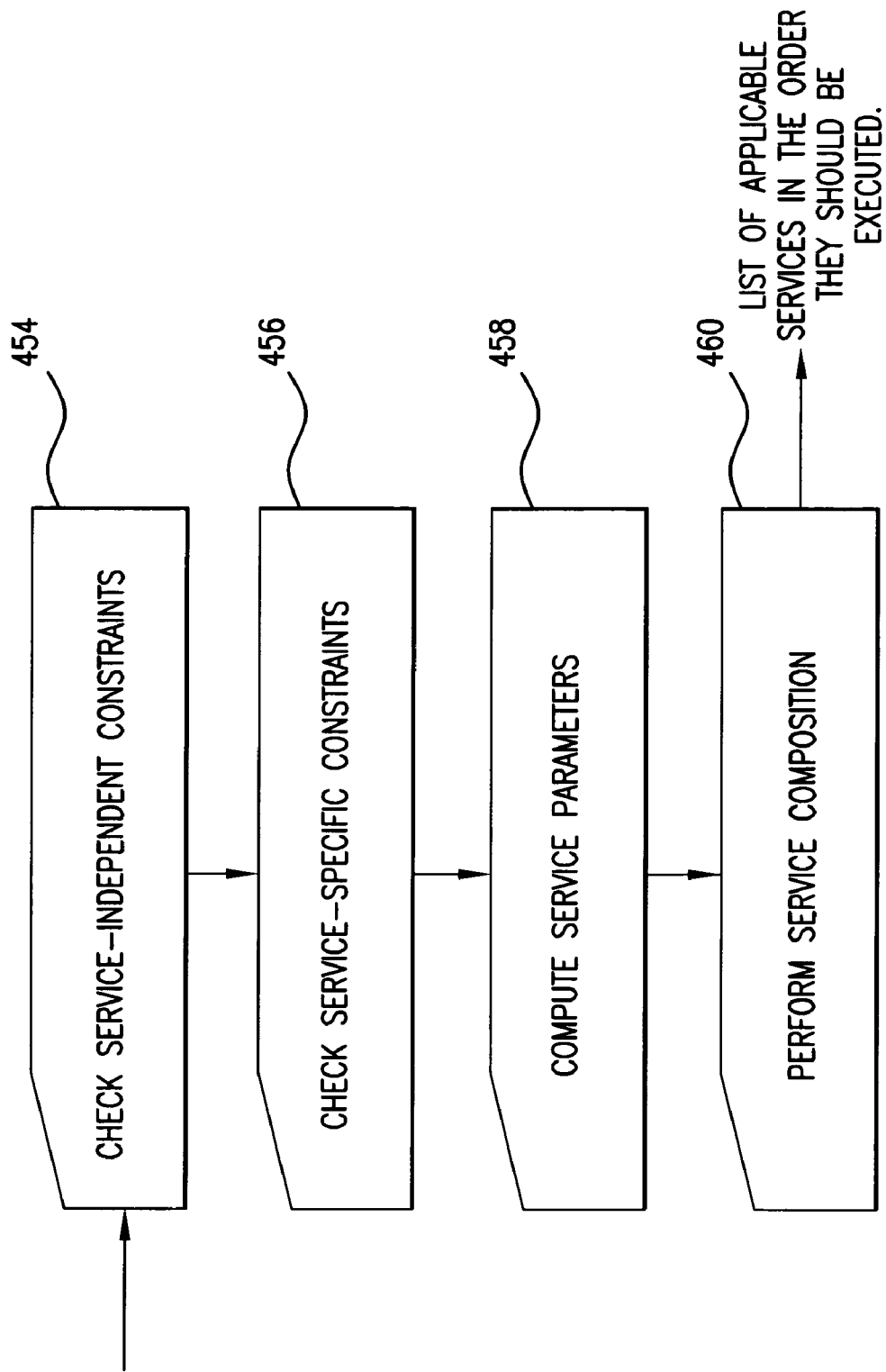

As illustrated in FIG. 4C, at Block 450 HTTP traffic between a client and server is monitored for an event such as an inference point. When an inference point is encountered, at Block 452 a query is issued to an inference engine. For each inference point encountered, inferencing is performed at Block 453 to determine applicable data transformation services and an order in which the applicable data transformation services should be applied. More specifically, as shown in FIG. 4D, in response to the query, the inference engine can check service independent constraints at Block 454, check service specific constraints at Block 456, compute service parameters at Block 458, and then perform service composition at Block 460. The process described in Blocks 454–460 is performed at each inference point and takes place between Blocks 452 and 463 of FIG. 4C. Inferencing taking place at each of the Blocks 454–460 will be described in greater detail below with reference to FIGS. 4E–4H. As a result of the inferencing process shown in FIG. 4D, the OCAE can generate a list of applicable services and specify the order in which those applicable services should be executed. After this inferencing process takes place at Blocks 454–460, then at Block 468 of FIG. 4C. Those selected data transformation services are applied to the requested data in the order specified by the inference engine. Transformed content can then be sent to a user agent. If none of the data transformation services is identified at Block 453, then the content is sent without transformation being performed on the content.

Figure 4E:
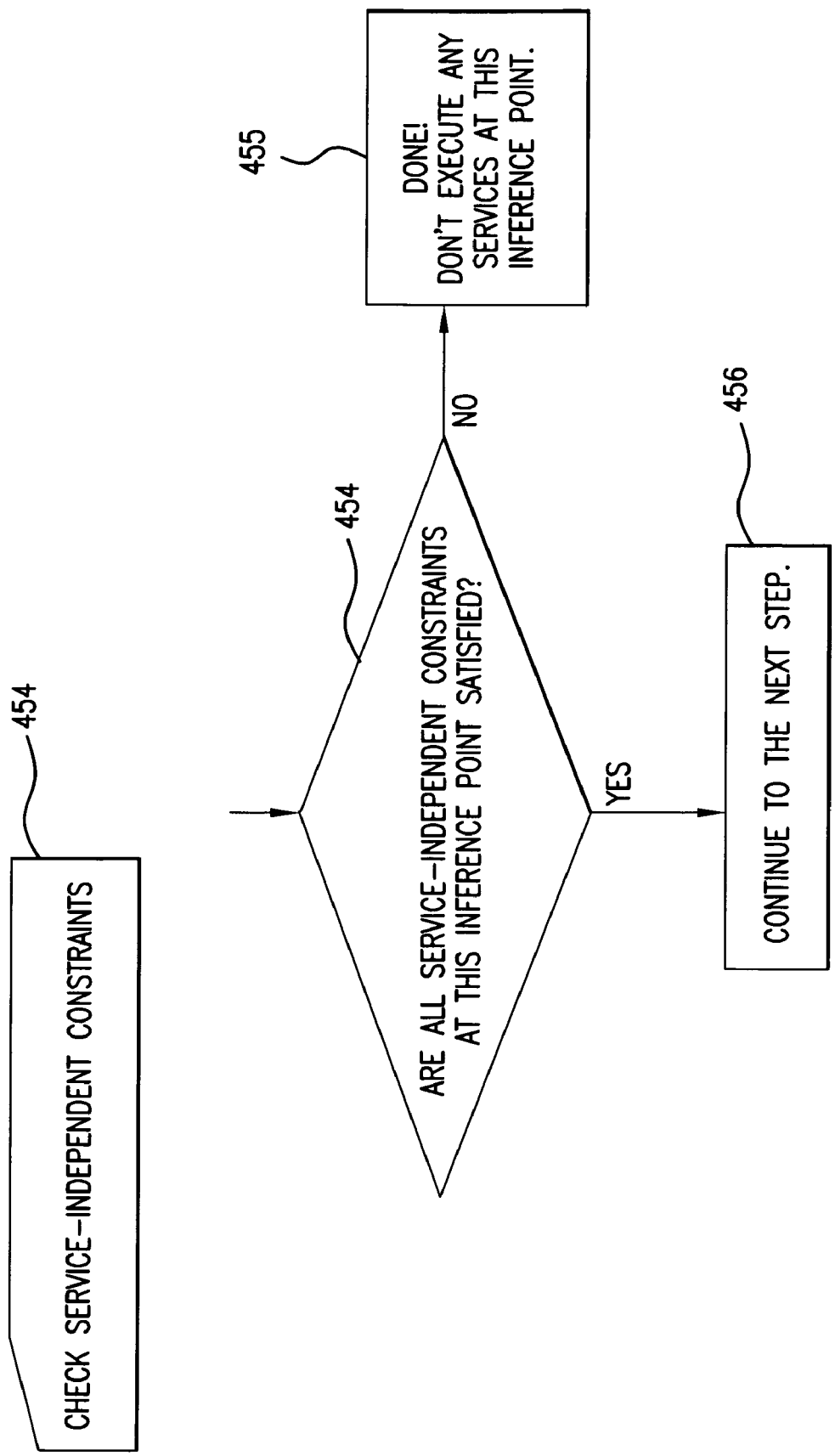
Figure 4H:
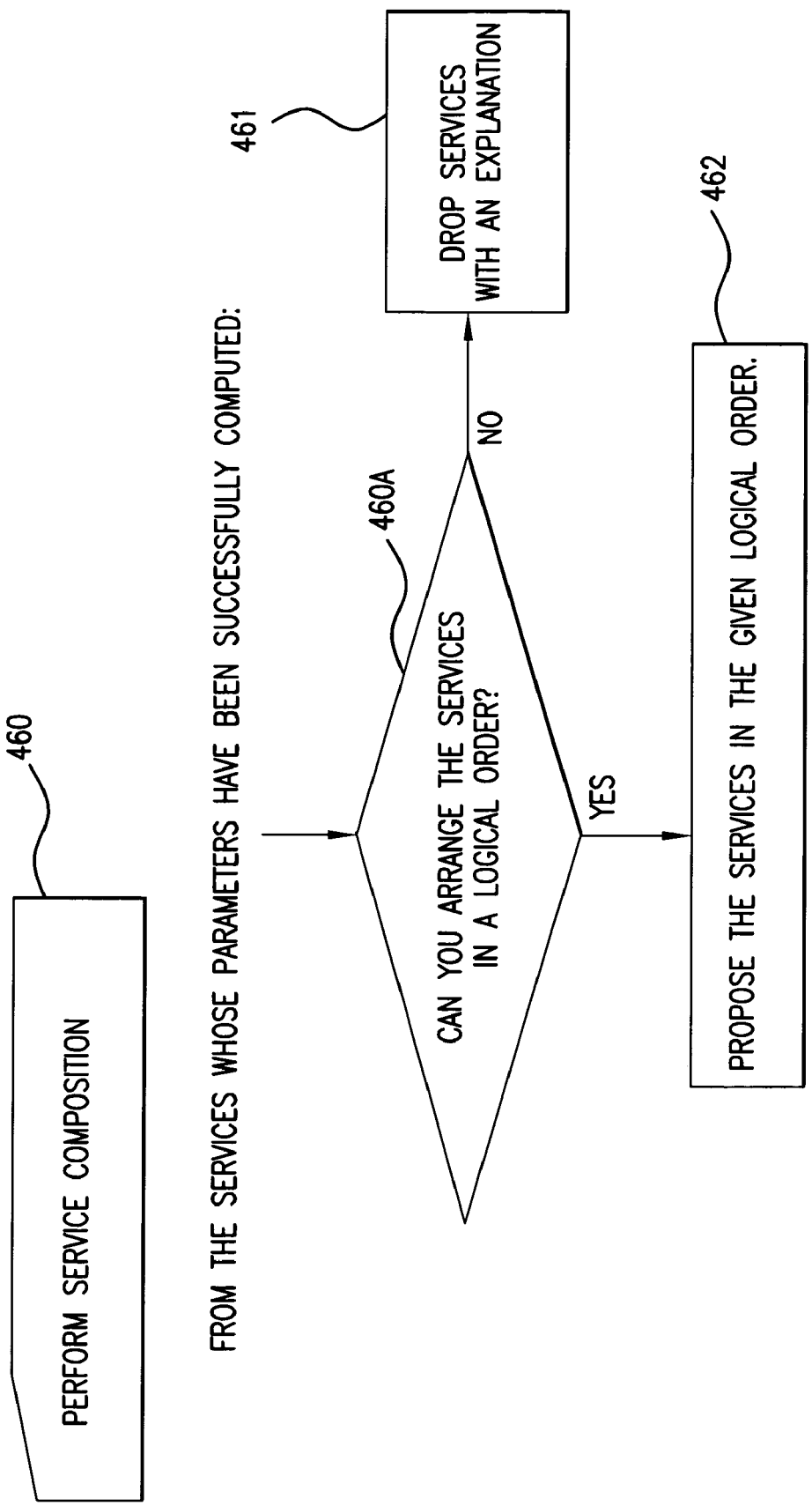

The inferencing process shown in FIG. 4D, will now be explained in greater detail with reference to FIGS. 4E through 4H. As shown in FIG. 4E, at Block 454, the inference engine first determines whether all service independent constraints at this inference point are satisfied. At Block 455, if all service independent constraints are not satisfied at this inference point, then the inference engine does not execute any services at this particular inference point. On the other hand, as shown at Block 456, if all service independent constraints are satisfied at this particular inference point, then as shown in FIG. 4F, the inference engine proceeds at Block 456A to find all potentially applicable services. Still referring to FIG. 4F, at Block 456B the inference engine determines whether for each of the potentially applicable services, whether the constraints for that service are satisfied. If the constraints for one of the potentially applicable service are not satisfied then, at Block 457 the inference engine drops that particular service. However, if the constraints for one of the potentially applicable services are satisfied, then the inference engine keeps that service and proceeds to Block 458, with only those applicable services whose constraints are satisfied. FIG. 4D further illustrates Block 458. At Block 458, for each of the applicable services whose constraints are satisfied, the inference engine then determines whether the service parameters needed for invocation of that service can be successfully computed. If the service parameters needed for invocation can be successfully computed, then the inference engine keeps that service, and continues to step 460 with only those services whose service parameters (needed for invocation) are successfully computed. On the other hand, if at Block 458 the inference engine determines that the service parameters needed further invocation of that particular service cannot be successfully computed, then Block 459 inference engine drops that particular service. FIG. 4H further describes details of Block 460 of FIGS. 4D and 4G. At Block 460A, from the services whose service parameters have been successfully computed, the inference engine then determines whether the applicable services can be arranged in a logical order. If at Block 460A the inference engine determines that the services can be arranged in a logical order, then at Block 462 the inference engine proposes the given logical order in which to arrange the applicable services, and continues to Block 463 of FIG. 4C. On the other hand, if at Block 460A of FIG. 4H, the inference engine determines that, from the services whose parameters have been successfully computed, that those services cannot be arranged in logical order, then at Block 461 the inference engine drops those services and provides an explanation of why content adaptation cannot take place.

Figure 5:
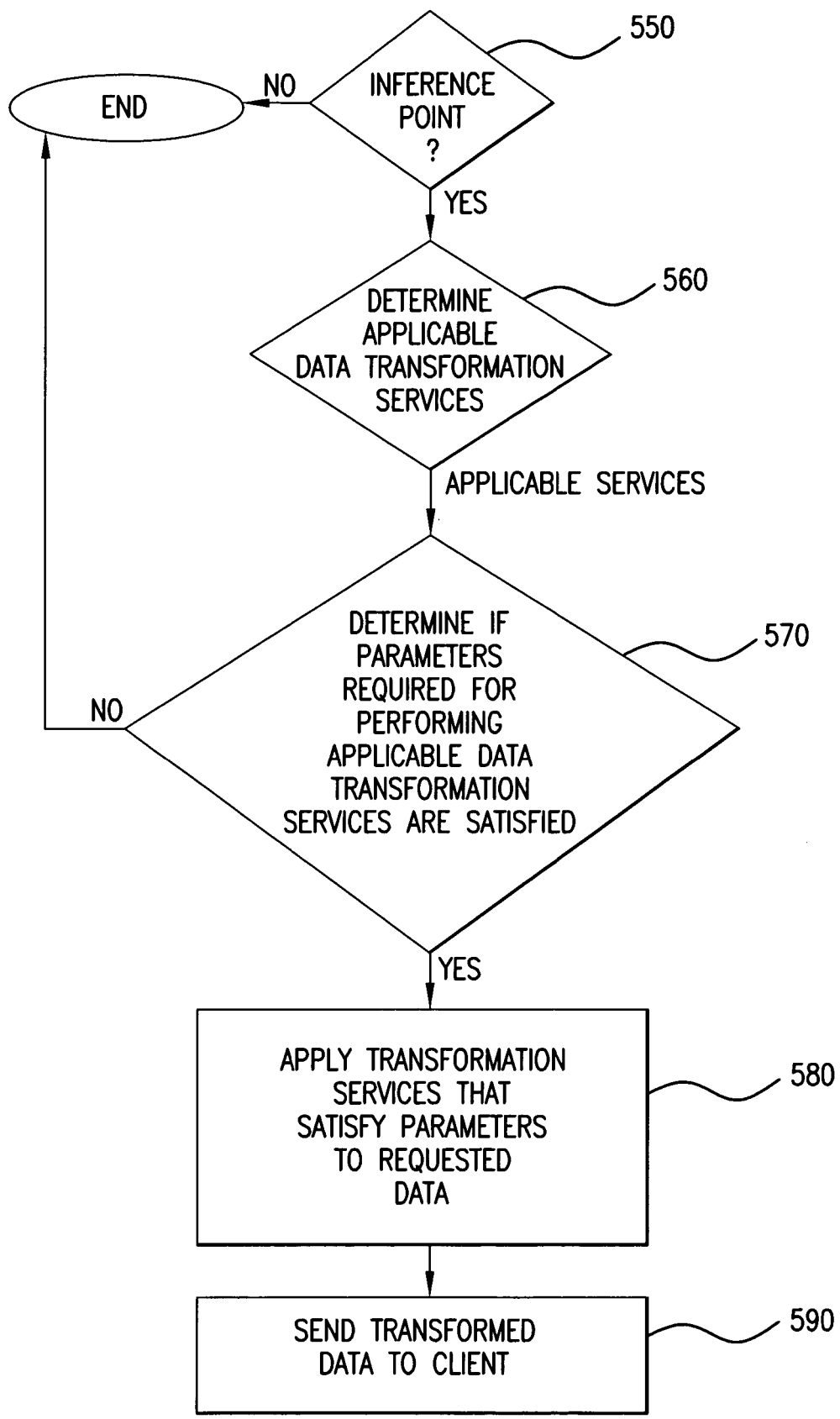
FIG. 5 shows a flow chart illustrating methods of transforming requested data according to preferred implementations of the present invention.

Shown in FIG. 5 are other performed methods of transforming requested data requested by a client from a server. After inference points are defined, whenever an inference point is encountered at Block 550 an inference engine is invoked at Block 560 to determine applicable data transformation services at that particular inference point. At Block 570, the inference engine may also compute parameters required for invocation of the applicable data transformation services, and if the parameters required for invocation of the applicable data transformation services are determined, at Block 580 the applicable data transformation services can be applied to the requested data to transform the requested data into transformed data. At Block 590, the transformed data is sent to the client.

Figure 6:
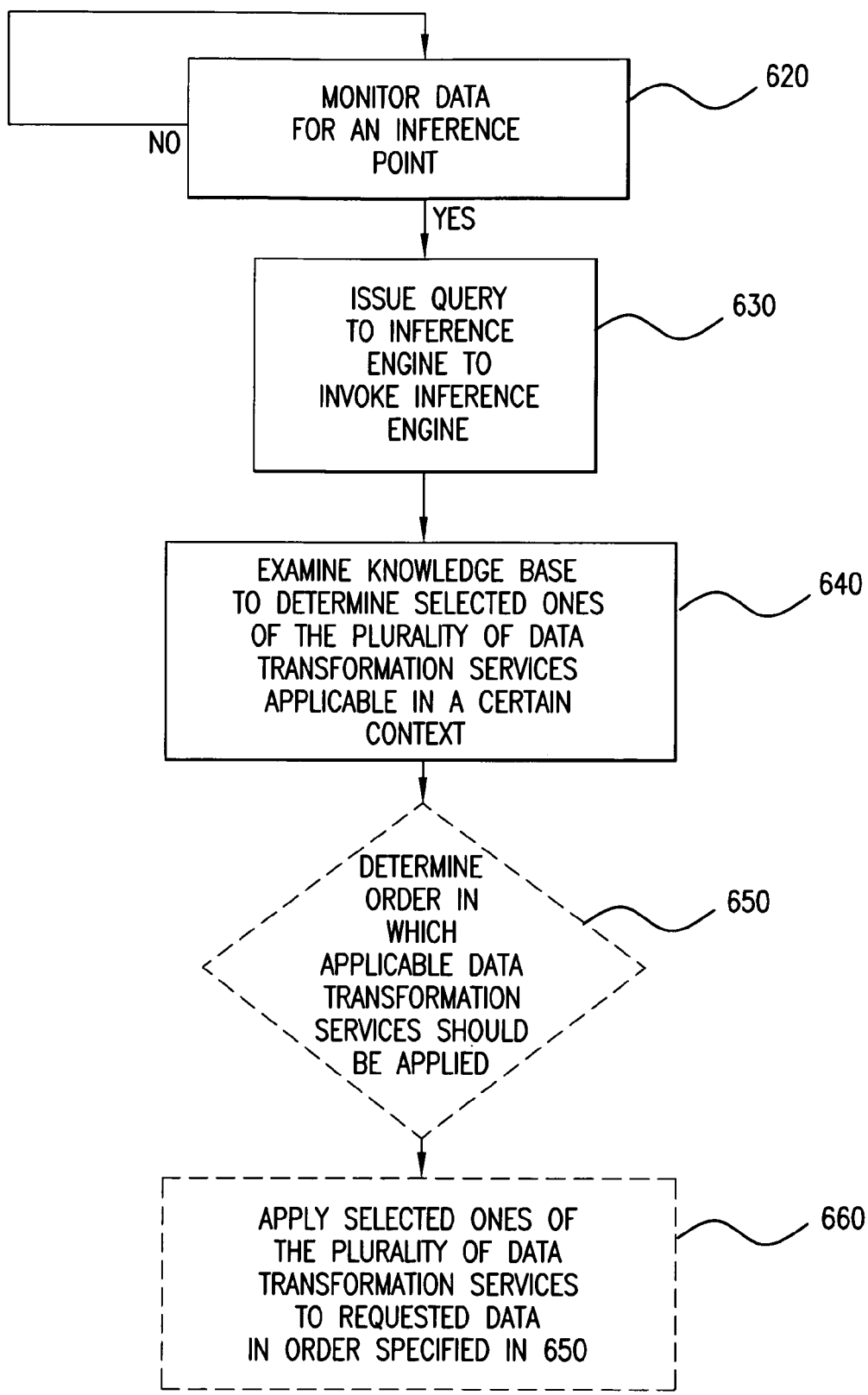
FIG. 6 shows a flow chart of illustrating other methods of transforming requested data according to preferred implementations of the present invention.

FIG. 6 shows other preferred methods of transforming requested data that flows between a client and a server. Transforming data will now described. A knowledge base is provided that includes service rules. Specific service rules are associated with particular inference points. At Block 620, data flowing between a client and a server is monitored for an event such as an inference point that is preferably detected whenever an inference point is encountered. At Block 630, an inference engine is invoked when an inference point is encountered by issuing queries to the inference engine. At Block 640, the knowledge base is examined to determine selected ones of a plurality of data transformation services that are applicable in a certain context to transform the requested data into transformed data. Preferably, the only service rules that are examined are the specific service rules associated with the inference point encountered. As shown at Block 650, if more than one data transformation service is applicable, an order in which the applicable data transformation services should be performed can be determined. As shown at Block 660, the requested data may be transformed by applying selected ones of the plurality of data transformation services to the requested data. The inference engine can also explain why a particular data transformation service is applicable for transforming the requested data into transformed data.

As will be appreciated by those of skill in the art, the above-described aspects of the present invention in FIGS. 4C through 6 may be provided by hardware, software, or a combination of the above. While various components of the OCAE have been illustrated in FIGS. 4C through 6, in part, as discrete elements, they may, in practice, be implemented by a microcontroller including input and output ports and running software code, by custom or hybrid chips, by discrete components or by a combination of the above.

The present invention may also take the form of a computer program product on a computer-readable storage medium having computer-readable program code means embodied in the medium. Any suitable computer readable medium may be utilized including hard disks, CD-ROMs, optical storage devices, or magnetic storage devices.

Various aspects of the present invention are illustrated in detail in the preceding figures, including FIGS. 4C through 6. It will be understood that each block of the diagrams of FIGS. 4C through 6, and combinations of blocks, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the block diagram illustrations of FIGS. 4C through 6 support combinations of means for performing the specified functions, combinations of steps for performing the specified functions and program instruction means for performing the specified functions. It will also be understood that each block of the illustrations of FIGS. 4C through 6, and combinations of blocks in the illustrations, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims. It will be apparent to those skilled in the art that various modifications and variations can be made in the data conversion mechanism described here without departing from the spirit or scope of the invention. In particular, the person skilled in the art will know how to adapt the principles of the invention to the new specifications which can appear in the definition of documents exchanged by a network such as the Internet, in programming, and in modeling objects. Thus, the present invention is not limited to any particular described embodiment. Instead it is intended that the present invention cover modifications and variations that come within the scope of the appended claims and their equivalents.

For instance, in the examples described above, additions and/or modifications to databases files can be performed by editing the database files in off-line mode. However, the administration service API can also be adapted to allow dynamic addition of facts to database files. Moreover, in the examples described above, the OCAE is stateless in that the OCAE, does not remember a state between service requests, and therefore to maintain a state between various processing points, it is necessary to use an application. However, OCAE could incorporate states such that the OCAE can remember a state between service requests and various processing points without the use of an application.

What is claimed is:

1. A data transformation module adapted to transform requested data that flows between a client and a server comprising:

a plug-in module adapted to be integrated with a computing node located between the client and the server, the plug-in module adapted to monitor a data flow between the client and the server for at least one inference point, wherein the plug-in module generates a query in response to the at least one inference point, wherein the data flow includes requested data;

a plurality of data transformation service modules each adapted to provide at least one data transformation service adapted to transform the requested data into transformed data;

an inference engine associated with the plug-in module and the plurality of data transformation modules; and a knowledge base associated with the inference engine, wherein the knowledge base includes data and rules for making a transformation decision, wherein the rules are segmented with respect to a selected inference point such that only selected rules are applicable to the selected inference point, wherein the inference engine receives the query from the plug-in module in response to the at least one inference point, and wherein for each particular inference point the inference engine examines the knowledge base to determine whether at least one action is to be performed at the at least one inference point.

2. A data transformation module as recited in claim 1, wherein the at least one action is to be performed and wherein the at least one action comprises determining selected ones of the data transformation service modules that are applicable in a certain context to transform the requested data into transformed data.

3. A data transformation module as recited in claim 2, wherein the at least one action is to be performed and wherein the at least one action further comprises determining an order in which appropriate ones of the data transformation service modules are to be applied to transform the requested data.

4. A data transformation module as recited in claim 2, wherein the inference engine examines only the selected rules and data relevant to those selected rules in determining at least one data transformation service to perform.

5. A data transformation module as recited in claim 4, wherein the knowledge in the knowledge base includes content adaptation parameters and content adaptation service rules used to determine whether the at least one action is to be performed, wherein the selected rules comprise selected ones of the content adaptation service rules associated with a particular inference point.

6. A data transformation module as recited in claim 5, wherein the content adaptation parameters include a database of supported user agents, a database of URLs that are not transformed, a database of available CA services including service constraints and service parameters of each CA service, a database of CA service level specifications for services configured in several different levels, a database of service exception rules that specify exceptional cases when services are not applied, a database of available text transformation scripts and associated constraints, and a database of MIME types and associated file suffixes.

7. A data transformation module as recited in claim 6, wherein the content adaptation service rules determine the applicability of a particular service module, wherein the content adaptation service rules each include zero or more constraints associated with the content adaptation service rule, wherein a particular content adaptation service rule is applicable only if all constraints associated with that rule are satisfied and no exception rules associated with that service are triggered, and wherein selected ones of the content adaptation service rules are associated with each inference point such that only the selected ones of the content adaptation service rules are evaluated at a particular inference point.

8. A data transformation module as recited in claim 7, wherein at a particular inference point, the inference engine examines the knowledge base to determine whether service-independent preconditions, constraints of applicable content adaptation service rules, and content adaptation parameters are satisfied, and the inference engine applies service composition logic in order to decide in which order services should be applied in case multiple services are applicable.

9. A data transformation module as recited in claim 7, wherein the inference engine is adapted to issue a message indicating why selected ones of the plurality of data transformation service modules are to be applied at specified times.

10. A data transformation module as recited in claim 7, wherein the requested data comprises WWW content, and wherein each data transformation module is adapted to be integrated with at least one of a plurality of computing nodes through which HTTP requests and responses travel.

11. A data transformation module as recited in claim 1, wherein the at least one inference point defines states and events in the computing node, wherein the query is generated based on a state of a particular inference point, and wherein the at least one inference point comprises a plurality of inference points.

12. A data transformation module as recited in claim 1, wherein the at least one inference point causes the inference engine to determine that zero or more of the data transformation service modules applicable in a given context.

13. A data transformation module as recited in claim 1, wherein the at least one action is to be performed and wherein the at least one action comprises application of a plurality of data transformation service modules to transform the requested data into transformed data.

14. A data transformation module as recited in claim 13, wherein the plurality of data transformation service modules is scalable such that new data transformation service modules may be added.

15. A data transformation module as recited in claim 1, wherein the at least one action is to be performed and wherein the at least one action comprises monitoring the requested data.

16. A data transformation module as recited in claim 1, wherein the plug-in module is adapted to be coupled to a proxy server to monitor HTTP traffic for events and to notify the inference engine when inference points are encountered.

17. A data transformation module as recited in claim 1, wherein the inference engine is a logic-based inference engine, and wherein the knowledge base is extensible.

18. A data transformation module as recited in claim 1, wherein the at least one action is to be performed and wherein the at least one action comprises routing of the requested data.

19. A data transformation module as recited in claim 18, wherein a stored copy of transformed data is sent to the client when the requested data has previously been transformed.

20. A method of transforming requested data that flows between a client and a server comprising:
providing a knowledge base that includes service rules, wherein specific service rules are associated with particular inference points;
monitoring data flowing between a client and a server for an event;
invoking an inference engine when an inference point is encountered; and
examining a knowledge base to determine selected ones of a plurality of data transformation services that are applicable in a certain context to transform the requested data into transformed data, wherein the service rules examined are the specific service rules associated with the inference point encountered.

21. A method of transforming requested data recited in claim 20, further comprising:
transforming the requested data by applying selected ones of the plurality of data transformation services to the requested data.

22. A method of transforming requested data recited in claim 20, further comprising:
applying the selected ones of a plurality of data transformation services to the requested data to transform the requested data into transformed data.

23. A method of transforming requested data recited in claim 20, further comprising:
if more than one data transformation service is applicable, determining an order in which the applicable data transformation services should be performed.

24. A method of transforming requested data recited in claim 20, further comprising:
generating a message responsive to why a particular data transformation service is applicable for transforming the requested data into transformed data.

25. A method of transforming requested data recited in claim 20, wherein monitoring data flowing between a client and a server for an event comprises:
identifying an inference point in state machines of an intermediary node and a plug-in module.

26. A method of transforming requested data recited in claim 20, wherein invoking an inference engine when an inference point is encountered comprises:
issuing queries to the inference engine when an inference point is encountered.

27. A method of transforming requested data requested by a client, comprising:
defining inference points;
invoking an inference engine when an inference point is encountered;
determining applicable data transformation services at a particular inference point;
computing parameters required for invocation of the applicable data transformation services; and
if parameters required for invocation of the applicable data transformation services are successfully computed, applying the applicable data transformation services to the requested data to transform the requested data into transformed data.

28. A system adapted to transform requested data that flows between a client and a server into transformed data, comprising:

means for providing service rules, wherein specific service rules are associated with particular inference points;

means for monitoring data flowing between a client and a server and calling means for inferencing when an inference point is encountered; and wherein means for inferencing is adapted to examine the knowledge to determine selected data transformation services of a plurality of data transformation services, wherein only the specific service rules are examined.

29. A system adapted to transform requested data recited in claim 28, further comprising:

means for transforming the requested data by applying selected ones of the plurality of data transformation services to the requested data.

30. A system adapted to transform requested data recited in claim 28, further comprising:

means for applying the selected ones of a plurality of data transformation services to the requested data to transform the requested data into transformed data.

31. A system adapted to transform requested data recited in claim 28, further comprising:

means, if more than one data transformation service is applicable, for determining an order in which the applicable data transformation services should be performed.

32. A system adapted to transform requested data recited in claim 28, further comprising:

means for generating a message responsive to why a particular data transformation service is applicable for transforming the requested data into transformed data.

33. A system adapted to transform requested data recited in claim 28, wherein means for monitoring data flowing between a client and a server for an event, comprises:

means for identifying an inference point in state machines of an intermediary node and a plug-in module.

34. A system adapted to transform requested data recited in claim 28, wherein calls to the inference engine when an inference point is encountered comprise queries to the inference engine when an inference point is encountered.

35. A system adapted to transform data requested by a client, comprising:

means for monitoring data flowing between a client and a server for an event, wherein the means for monitoring calls an inference engine when an inference point is encountered;

means for determining applicable data transformation services at a particular inference point and computing parameters required for invocation of the applicable data transformation services;

means for applying the applicable data transformation services to transform the requested data into transformed data, if the parameters are successfully computed; and means for sending the transformed data to a client.

36. A computer network, comprising:

a server that includes data;

a client that requests data from the server;

a computing node located between the client and the server, wherein the computing node includes at least one inference point associated therewith, wherein each inference point has at least one content adaptation service rule associated therewith; and a data transformation module adapted to transform requested data that flows between a the client and the server into transformed data, the at least one data transformation module integrated with the computing node.

37. The computer network according to claim 36, the data transformation module comprising:

a plug-in module adapted to be integrated with a computing node located between the client and the server, wherein the plug-in module is adapted to monitor a data flow between the client and said server for at least one inference point, wherein the plug-in module generates a query in response to the at least one inference point, wherein the data flow includes requested data;

a plurality of data transformation service modules each adapted to provide at least one data transformation service to transform the requested data into transformed data;

an inference engine associated with the plug-in module and the plurality of data transformation modules; and a knowledge base associated with the inference engine, wherein the knowledge base includes rules and data relevant to the rules for making a transformation decision, wherein the rules are segmented with respect to a selected inference point such that only selected rules are applicable to the selected inference point, wherein the inference engine receives the query from the plug-in module in response to the at least one inference point, and examines the knowledge base to determine whether at least one action is to be performed at the at least one inference point.

38. The computer network according to claim 36, wherein the computing node comprises a caching proxy server.

39. The computer network according to claim 36, wherein the computing node comprises the client.

40. The computer network according to claim 36, wherein the computing node comprises the server.

41. A computer network, comprising:

at least one server that includes data;

at least one client that requests data from the server;

a plurality of computing nodes located between the client and the server, wherein each computing node includes at least one inference point associated therewith, wherein each inference point has at least one content adaptation service rule associated therewith; and a plurality of data transformation modules adapted to transform requested data that flows between the client and the server into transformed data, each of the data transformation modules adapted to be integrated with at least one of the plurality of the computing nodes.

42. The computer network according to claim 41, wherein each of the data transformation modules comprises:

a plug-in module adapted to be integrated with a computing node located between the client and the server, wherein said plug-in module is adapted to monitor a data flow between said client and said server for at least one inference point, wherein the plug-in module generates a query in response to the at least one inference point, wherein the data flow includes requested data;

a plurality of data transformation service modules each adapted to provide at least one data transformation service to transform the requested data into transformed data;

an inference engine associated with the plug-in module and the plurality of data transformation modules; and a knowledge base associated with the inference engine, wherein the knowledge base includes rules and data relevant to the rules for making a transformation decision, wherein the rules are segmented with respect to a selected inference point such that only selected rules are applicable to the selected inference point, wherein the inference engine receives the query from the plug-in module in response to the at least one inference point, and examines the knowledge base to determine whether at least one action is to be performed at the at least one inference point.

43. The computer network according to claim 41, wherein data transformation modules are coupled to selected ones of the plurality of computing nodes, such that the requested data is transformed at each of the selected ones of the plurality of nodes.

44. The computer network according to claim 41, wherein one of the computing nodes comprises a caching proxy server.

45. The computer network according to claim 41, wherein one of the computing nodes comprises the client.

46. The computer network according to claim 41, wherein one of the computing nodes comprises the server.

47. The method of transforming requested data that flows between a client and a server, comprising:

monitoring data for an inference point;

issuing a query to an inference engine in response to an inference point;

performing an inferencing process to determine a list of applicable data transformation services and an order in which the applicable data transformation services should be executed; and if at least one applicable data transformation service is found, applying the applicable data transformation services to the requested data in the order determined by the inference engine to transform the requested content into transformed content.

48. The method of transforming the requested data recited in claim 47, further comprising:

sending the transformed content to a user agent.

49. A method of transforming the requested data as recited in claim 47, wherein performing an inferencing process to determine a list of applicable data transformation services comprises:

checking service independent constraints of each applicable data transformation service;

checking service specific constraints of each applicable data transformation service;

computing service parameters of each applicable data transformation service; and performing service composition to determine the order in which the applicable data transformation services should be executed.

50. A method of transforming the requested data as recited in claim 49, wherein checking service independent constraints comprises:

determining whether all service independent constraints of each applicable data transformed service are satisfied at a particular inference point.

51. A method of transforming the requested data as recited in claim 49, wherein checking service specific constraints comprises:

determining all potentially applicable data transformation services;

determining whether the service specific constraints for each potentially applicable data transformation service are satisfied.

52. A method of transforming the requested data as recited in claim 51, wherein determining whether the service specific constraints for each potentially applicable data transformation service are satisfied comprises:

determining whether service parameters required for invocation of each data transformation service can be successfully computed.

53. A method of transforming the requested data as recited in claim 49, wherein for those data transformation services whose service parameters needed for invocation have been successfully computed, the step of performing service composition comprises:

arranging the data transformation services in logical order.

54. A data transformation module adapted to transform requested data that flows between a client and a server into transformed data, comprising:

a plug-in module adapted to be integrated with a computing node located between the client and the server, wherein said plug-in module is adapted to monitor a data flow between said client and said server for at least one inference point, wherein the plug-in module generates a query in response to the at least one inference point, wherein the data flow includes requested data;

a plurality of data transformation service modules each adapted to provide at least one data transformation service to transform the requested data into transformed data; and a content adaptation logic module associated with the plug-in module and the plurality of data transformation modules, wherein the content adaptation logic module includes data and rules for making a transformation decision, wherein the rules are segmented with respect to a selected inference point such that only selected rules are applicable to the selected inference point, and wherein the content adaptation logic module receives the query from the plug-in module in response to the at least one inference point, and wherein for each particular inference point the content adaptation logic module determine whether at least one action is to be performed at the at least one inference point.

55. A data transformation module as recited in claim 54, wherein the content adaptation logic module comprises:

an inference engine associated with the plug-in module and the plurality of data transformation modules; and a knowledge base associated with the inference engine, wherein the knowledge base includes data and rules for making a transformation decision, wherein the rules are segmented with respect to a selected inference point such that only selected rules are applicable to the selected inference point, wherein the inference engine receives the query from the plug-in module in response to the at least one inference point, and wherein for each particular inference point the inference engine examines the knowledge base to determine whether at least one action is to be performed at the at least one inference point.

56. A data transformation module as recited in claim 54, wherein the at least one action is to be performed and wherein the at least one action comprises determining selected ones of the data transformation service modules that are applicable in a certain context to transform the requested data into transformed data.

57. A data transformation module as recited in claim 56, wherein the at least one action is to be performed and wherein the at least one action further comprises determining an order in which appropriate ones of the data transformation service modules are to be applied to transform the requested data.

58. A data transformation module as recited in claim 56, wherein the inference engine examines only the selected rules and data relevant to those selected rules in determining at least one data transformation service to perform.

59. A data transformation module as recited in claim 58, wherein the knowledge in the knowledge base includes content adaptation parameters and content adaptation service rules used to determine whether the at least one action is to be performed, wherein the selected rules comprises selected ones of the content adaptation service rules associated with a particular inference point.

60. A data transformation module as recited in claim 59, wherein the content adaptation service rules determine the applicability of a particular service module, wherein the content adaptation service rules each include zero or more associated constraints with the content adaptation service rule, wherein a particular content adaptation service rule is applicable only if all constraints associated with that rule are satisfied and no exception rules associated with that service are triggered, and wherein selected ones of the content adaptation service rules are associated with each inference point such that only the selected ones of the content adaptation service rules are evaluated at a particular inference point.

61. A data transformation module as recited in claim 60, wherein at a particular inference point, the inference engine examines the knowledge base to determine whether service-independent preconditions, constraints of applicable content adaptation service rules, and content adaptation parameters are satisfied, and applies service composition logic in order to decide in which order services should be applied in case multiple services are applicable.

62. A data transformation module as recited in claim 54, wherein the at least one data transformation service module is selected from a plurality of data transformation modules and wherein the plurality of data transformation modules each adapted to provide at least one transformation service, comprise:

a plurality of data transformation service modules associated with the plug-in module and the inference engine, wherein each of the plurality of data transformation service modules is adapted to perform at least one data transformation of a plurality of data transformations on the requested data, and wherein selected ones of the plurality of data transformation service modules are applied to transform the requested data.

63. A data transformation module as recited in claim 54, wherein the at least one action is to be performed and wherein the at least one action comprises application of a plurality of data transformation service modules to transform the requested data into transformed data.

64. A data transformation module as recited in claim 54, wherein the at least one action is to be performed and wherein the at least one action comprises monitoring the requested data.

65. A data transformation module as recited in claim 54, wherein the at least one action is to be performed and wherein the at least one action comprises routing of the requested data.

* * * * *